US006754218B1

(12) United States Patent
Murakami

(10) Patent No.: US 6,754,218 B1
(45) Date of Patent: Jun. 22, 2004

(54) DIVERSITY HANDOVER PROCESSING APPARATUS AND NETWORK CONTROL SYSTEM USING THE SAME

(75) Inventor: Masaru Murakami, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/382,775

(22) Filed: Aug. 25, 1999

(30) Foreign Application Priority Data

Apr. 26, 1999  (JP) ........................................... 11-118846

(51) Int. Cl.[7] .......................... H04L 12/28; H04L 12/56
(52) U.S. Cl. .................. 370/395.7; 370/412; 370/395.1
(58) Field of Search ................................ 370/338, 349, 370/331, 395.1, 310.2, 310.1, 332, 335, 466, 467, 267, 347, 395.7, 395.71, 395.72; 375/267, 347; 455/132, 137, 436, 437, 438, 439, 440, 441, 442, 443, 444

(56) References Cited

U.S. PATENT DOCUMENTS

| | | | |
|---|---|---|---|
| 5,452,297 A | * | 9/1995 | Hiller et al. ........... 370/395.61 |
| 5,544,164 A | | 8/1996 | Baran |
| 5,612,952 A | * | 3/1997 | Motoyama .................. 370/412 |
| 5,878,045 A | | 3/1999 | Timbs |
| 5,920,817 A | * | 7/1999 | Umeda et al. ............... 455/437 |
| 5,940,381 A | * | 8/1999 | Freeburg et al. ............. 370/331 |
| 6,009,086 A | * | 12/1999 | Freeburg et al. ......... 370/310.2 |
| 6,128,287 A | * | 10/2000 | Freeburg et al. ............ 370/331 |
| 6,151,314 A | * | 11/2000 | Rauhala ....................... 370/350 |
| 6,373,834 B1 | * | 4/2002 | Lundh et al. ................ 370/350 |
| 6,470,188 B1 | * | 10/2002 | Ohtani et al. ............... 455/503 |
| 6,483,838 B1 | * | 11/2002 | Ostman et al. ........ 370/395.31 |
| 6,504,845 B1 | * | 1/2003 | Petersen et al. ............. 370/412 |
| 6,574,221 B1 | * | 6/2003 | Petersen .................. 370/395.1 |

FOREIGN PATENT DOCUMENTS

| | | |
|---|---|---|
| EP | 0835009 | 4/1998 |
| JP | 6372293 | 4/1988 |
| JP | 21669 | 1/1990 |
| JP | 3218142 | 9/1991 |
| JP | 498937 | 3/1992 |
| JP | 06120974 | 4/1994 |
| JP | 25691118 | 10/1996 |

OTHER PUBLICATIONS

Mobile Communication System, published by Ohm–sha.
Easy Digital Exchange, published by Tsushin Kyokai
Easy–to–Understand Description of Digital Mobile Communications, published by Ohm–sha.
Nikkei Electronics, No. 680, published by Nikkei BP, pp. 85–90.
Basic Knowledge of Data Exchange, published by Denki Tsushin Kyokai.
B–ISDN Pictorial Reader, published by Ohm–sha.
Mastering TCP/IP, published by Ohm–sha.
Mobile Communications, published by Maruzen.

* cited by examiner

Primary Examiner—Wellington Chin
Assistant Examiner—Jamal A. Fox
(74) Attorney, Agent, or Firm—Antonelli, Terry, Stout & Kraus, LLP

(57) ABSTRACT

A diversity handover processing apparatus includes a shared buffer memory for storing signals input from a mobile station and converted into ATM cells, a combining/copy information table for storing connections necessary to one of a combining and a copy of the ATM cells received from the shared buffer memory, a combining/copy controller for reading information concerning connections in the combining/copy information table, a shared buffer memory handling section for designating addresses contained in the information read by the combining/copy controller, and a combining/copy processor for performing one of combining and copy of the ATM cells read out of the shared buffer memory in respect of the radio terminal.

14 Claims, 22 Drawing Sheets

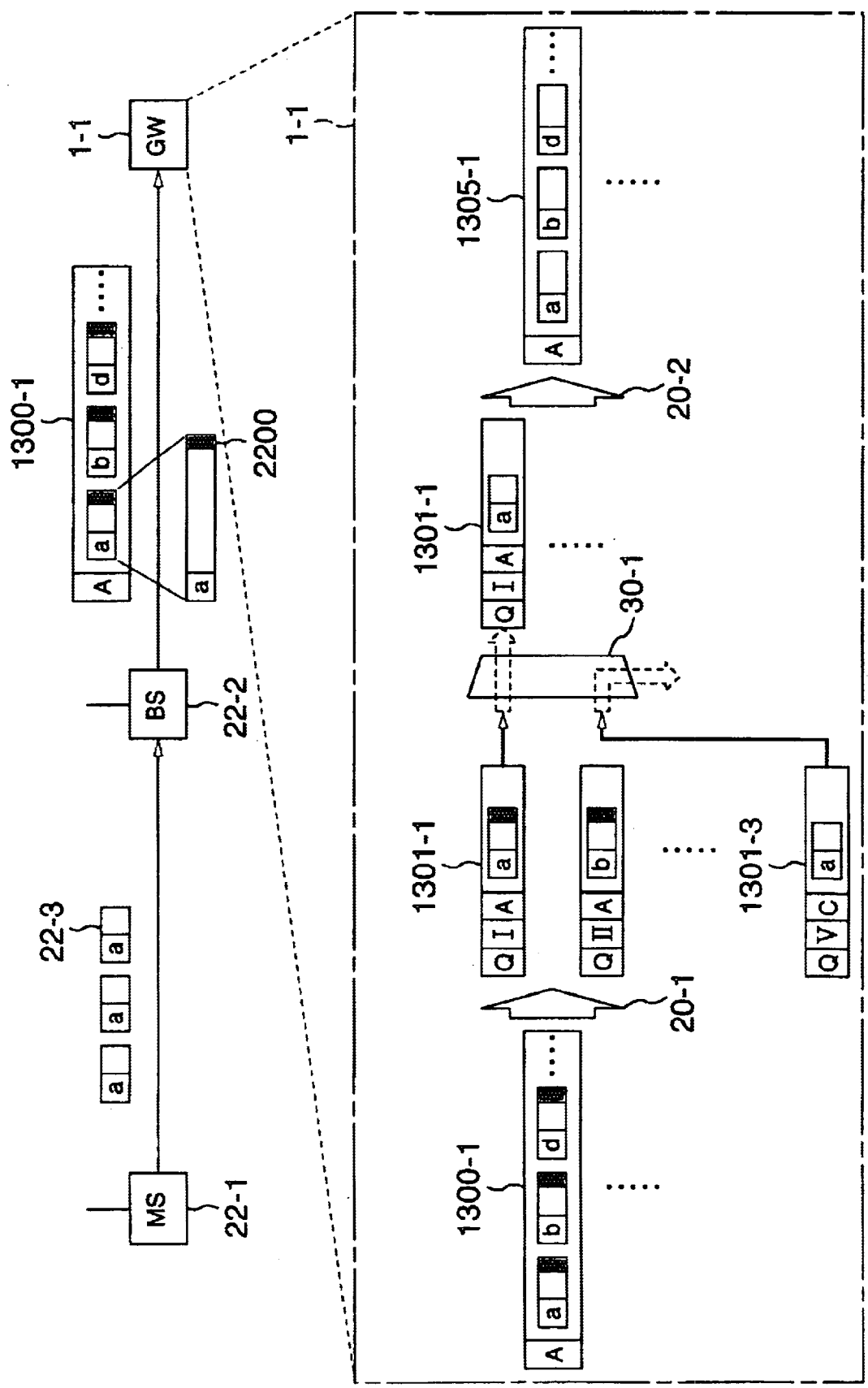

DIVERSITY HANDOVER PROCESSING APPARATUS AND NETWORK CONTROL SYSTEM USING THE SAME

BACKGROUND OF THE INVENTION

The present invention relates to construction of diversity handover processing apparatuses and network control systems using the same, and more particularly to a network control system for use in a multimedia network which mutually connects mobile radio network and other networks and is suitable for handling various kinds of media (voice/image/data) communicated at various speeds, and a diversity handover processor used in the system.

In digital networks in these days, widespread use has been made of a network handling radio signal transmission media such as a mobile radio network, in addition to the conventional cable network using metallic conductors or optical fibers. In connection with the mobile radio network as above, there are available the existing STM (synchronous transfer mode) network as described in "Mobile Communication System" published by Ohm-sha, a PDC (personal digital cellular) or PHS (personal handyphone system) radio network described in "Easy Digital Exchange" published by Denki Tsushin Kyokai in which signals carried on time slots are communicated like the time-division network for communicating signals carried on time-shared time slots within a synchronized frame, or a CDMA (code division multiple access) radio network as described in "EASY-TO-UNDERSTAND DESCRIPTION OF DIGITAL MOBILE COMMUNICATIONS" published by Ohm-sha, pp 32 and 33 in which signals modulated with codes different for the signals are communicated. Further, a wideband CDMA (hereinafter referred to as W-CDMA) described at page 85 and ensuing pages in "Nikkei Electronics No. 680 published by Nikkei BP has been highlighted as a communication system which can ensure transmission and reception of various kinds of signals at various speeds, such as voice, image and high-speed data with the same quality as that in the existing cable communication network even when the mobile station moves at a high speed and is expected to be put into practice as early as possible.

On the other hand, at present, there exist various networks including a STM (synchronous transfer mode) network, a packet network as described in "Basic Knowledge of Data Exchange" published by Denki Tsushin Kyokai in which signals carried on packets of variable length are communicated, an ATM (asynchronous transfer mode) network) as described in "E-ISDN Pictorial Reader" published by Ohm-sha in which signals carried on packets of fixed length called cells are communicated or an internet as described in "Mastering TCP/IP" published by Ohm-sha in which signals are carried on packets of variable length called IP packets and the IP packets are communicated pursuant to the procedures called internet protocol(IP), and media of voice, image and data are communicated.

The aforementioned actual networks and communication systems have been developed and introduced independently of each other and signal forms (speed and format) and communication procedures (signal mode and protocol) differ for the individual networks and systems. In addition, characteristics of the networks are also different and therefore, there are differences in offered communication services and control mechanisms for offering the services (for example, the construction of operation system, the construction of hardware/software interfaces and the function and structure of communication application software).

The network user conducting transmission and reception of information by utilizing the networks and the provider offering the networks have an earnest desire for the elimination (or absorption) of differences in the aforementioned networks which will be conductive to communication in which the user and provider can be unconscious of the construction of the networks and the procedures and can communicate with the other party by using communication service permitting optimal communication of information whenever they want to use and whatever apparatus (terminal) they use, because this improves easiness of using the communication equipment, decreases costs and contributes to development of society. In other words, the advent of a network control system, a communication control apparatus and a method of controlling the system and apparatus has been desired which can unify the aforementioned various networks to absorb the differences in the individual radio networks and permit, through simplified control, inter-network connection that sets up mutual connection for communication. Especially, the mobile radio network such as W-CDMA is expected to be developed rapidly in the future and it is important to construct a unified network by mutually connecting various kinds of existing networks and the mobile radio network.

Handling of the signal process is sometimes required to be changed depending on differences in media and the mutual relation to other networks. Exemplarily, some of the signal process specific to mobile targets need the error correction coding process but on the other hand, in some applications, it is preferable that the coding process as above is not carried out from the standpoint of connection to the existing networks. Further, in the mobile communication, an interleave technique is employed for the sake of coping with the burst error. This technique is described in, for example, "Mobile Communication" edited by Masaaki Shinji, published by Maruzen Kabushiki Kaisha, according to which data processed to, for example, Reed-Solomon code are rearranged for transmission and they are reversely rearranged on the receiving side. During the rearrangement, a block memory of $\underline{m}$ rows and $\underline{n}$, columns is used and there arises a delay in storage to the memory. Accordingly, in a service prone to be affected by the delay time, such as voice, the interleave process is not carried out in some applications even at the cost of debasement of the capability of error correction.

After the interleave process, data in a predetermined unit in the block memory is read collectively to provide burst-like data. Such data must be smoothed in accordance with a timing in a mobile radio network when transferred to that network and therefore there needs a buffer for receiving such a burst signal as above. When interleave is not carried out, no burst signal is generated and only control timed to the mobile radio network may be carried out.

Further, when down-load of file is effected during access to an internet, unidirectional traffic from the network to the terminal takes place and when it is presupposed that the same traffic passes bidirectionally, resources of one of the network and terminal becomes sometimes unwanted. Preferably, the use rate of individual media will be determined statistically to permit apparatus and network having the construction commensurate with the determined use rate to be constructed. But media used by users change day by day and the situation is further changed by mutual connection with other networks. Accordingly, when connection to various kinds of networks is taken into account, it is necessary that various kinds of service can be handled by way of individual connections and impairment of economical advantage can be prevented.

SUMMARY OF THE INVENTION

In diversity handover, a process is executed in which quality evaluation is effected in a unit of packet and a packet of good quality is selected. On the other hand, for the purpose of improving the line efficiency between the base station and the network control system, it is conceivable that the base station first stores a plurality of CPS (Common Part Sublayer) packets in a payload of one ATM cell and then transmits them to a network. In this case, the network control system cannot perform the diversity handover process unless the ATM cell is decomposed in a unit of packet to generate one ATM cell every CPS packet. The reason for this is that in the diversity handover, the quality evaluation being carried out in a unit of packet. Accordingly, in the network control system, the number of ATM cells is increased by the number of CPS packets and the process in the network control system is loaded several times as compared to the process of ATM cells in the communication line, with the result that a switch used in the network control system is required to have higher efficiency.

In the case of communication between conventional fixed telephones, the speech path is not changed in general, during communication once a call is connected. In the case of mobile communication or network, however, a mobile station is movable and a base station with which the mobile station communicates can be changed even after a call is connected. As the base station is changed, a process for addition and deletion of communication path takes place in the communication control system accommodating the base station. Further, in the CDMA system, for the purpose of performing the diversity handover process, a plurality of speech paths must be maintained or deleted in respect of one mobile station in the communication control system. As described above, disadvantageously, the process for addition or deletion of speech path must be carried out more frequently in the CDMA mobile system than in the fixed telephone. Further, since speech paths which are larger in number than mobile stations to be connected must be maintained, resources in the communication control system must be utilized efficiently, that is, deleted or erased speech path resources must be reused efficiently at once. An object of the present invention is to provide a diversity handover processing apparatus which can realize the aforementioned unification of a mobile radio network and the existing network or mutual connection therebetween and a network control system using the diversity handover processing apparatus.

According to an aspect of the present invention, a diversity handover processing apparatus comprises a shared buffer memory for storing signals inputted from a communication terminal and converted into ATM cells, a combining/copy information table for storing connections necessary to selective combining or copy of the ATM cells received from the shared buffer memory, a combining/copy controller for reading information concerning connections in the combining/copy information table in respect of the communication terminal, a shared buffer memory handling section for designating addresses contained in the information read by the combining/copy controller, the addresses being of the shared buffer memory and concerning the connections, and controlling read operation of ATM cells designated by the addresses, and a combining/copy processor for performing selective combining or copy of the ATM cells read out of the shared buffer memory in connection with the communication terminal.

According to another aspect of the present invention, a network control system comprises a plurality of interfaces for converting signals from a communication terminal into ATM cells added with header information indicative of a predetermined destination, an ATM switch for delivering the ATM cells inputted from the interfaces on the basis of the header information of the ATM cells, and a diversity handover processing apparatus for applying a combining or copy signal process to the ATM cells inputted from the ATM switch in accordance with a state of the communication terminal and transmitting the processed ATM cells to the ATM switch.

With the above construction of the invention, signals from the communication terminal can be converted into ATM cell forms and an ATM cell of good quality can be selected from the ATM cells received through the ATM switch to realize the combining/copy or so-called diversity handover process.

BRIEF DESCRIPTION OF THE DRAWINGS

FIG. 22 is a diagram showing the process flow during diversity handover.

DESCRIPTION OF THE EMBODIMENTS

Figure 1:
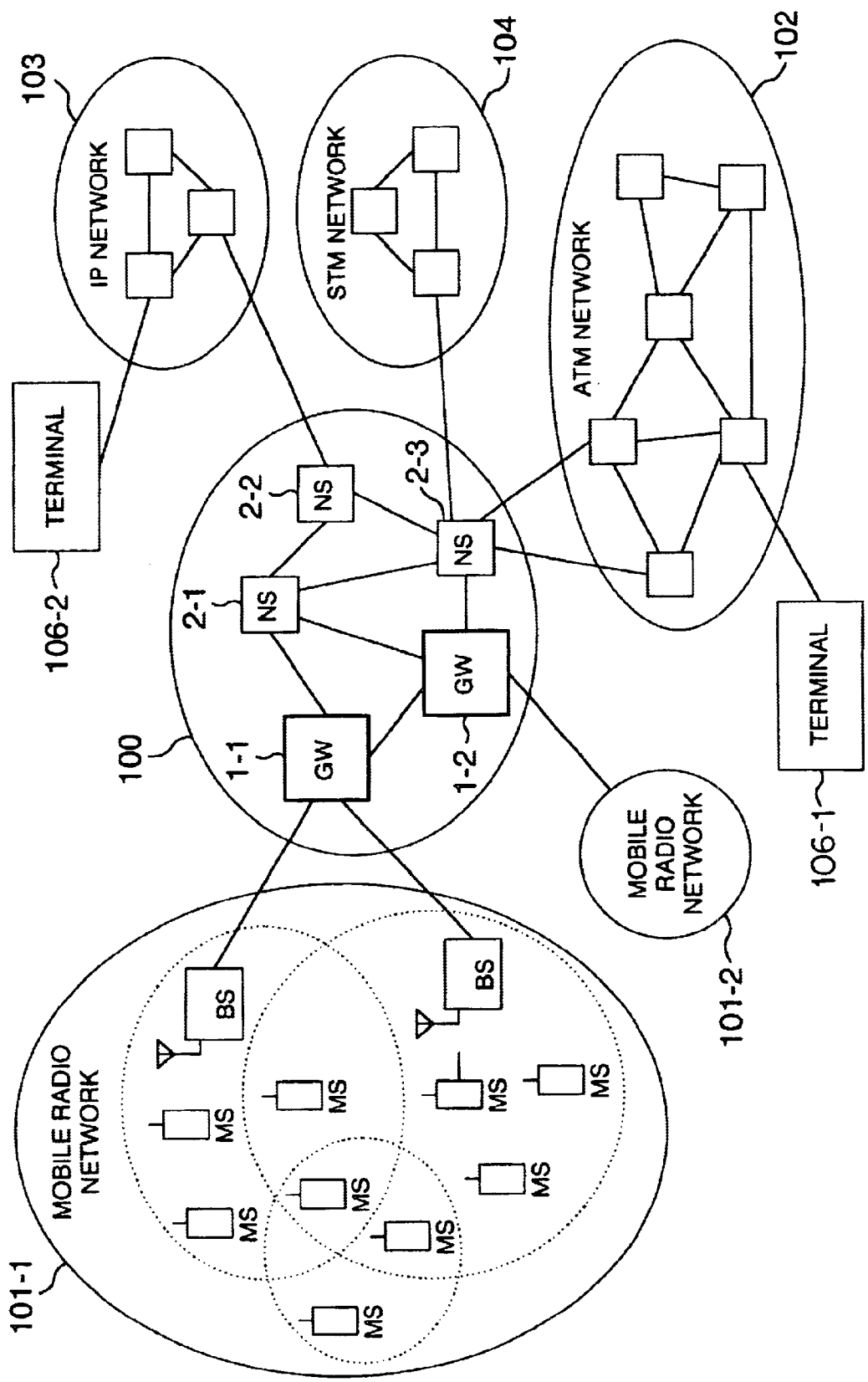
FIG. 1 is a diagram showing a configuration of networks using a network control system of the present invention.

Embodiments of a network control system and a diversity handover processing apparatus according to the present invention will be described hereunder in regular sequence of the following (1) to (5):

(1) network control system
(2) diversity handover processing apparatus
(3) processing of signals between a base station and the network control system carried out by means of the diversity handover
(4) operation when a mobile station moves through each zone
(5) operation during selective combining.

The network control system and the diversity handover processor according to the invention embodied as will be described hereinafter are mere examples and the invention may also be applicable to interconnection between networks of different type, for example, between an ATM network and an IP network or between a ATM network and the IP network.

(1) Network Control System

FIG. 1 is a diagram showing an example of a configuration of networks using the network control system of the present invention. In reference numerals designating components to be described hereinafter, the initial numerals are used to indicate individual different components and are followed by hyphenated numerals used to indicate corresponding like components. But the hyphenated numerals will sometimes be omitted.

The networks, herein represented by a mobile radio network 101 (mobile radio network 101-1 through 101-2) such as CDMA, W-CDMA, PDC or PHS, an ATM network (for example, cell relay network) 102 for transmission and reception of information in the form of ATM cells, an IP network (for example, OCN (Open Computer Network) presented by NTT (Nippon Telephone & Telegraph)) 103 for transmission and reception of information in the form of IP packets and a STM network (for example, digital switching network and INS (Information Network System) 64 network presented by NTT) 104, may be connected to a multimedia network 100 of the present invention having a network control system GW 1 (network control system GW 1-1 through 1-2) and a switching system NS 2 (switching system 2-1 through 2-3) for establishing connection :between different kinds of networks.

Exemplarily, the network control system GW 1 is connected to the mobile radio network 101 so as to control the mobile radio network 101 and terminate or convert signals specific to the mobile radio network. When communication is carried out between a mobile station MS, via a base station BS, of the mobile radio network 101 and a user terminal 106 (user terminal 106-1 through 106-2) accommodated in another network, the GW 1 transmits and receives not only information to be communicated but also control information necessary to the switching system NS 2 adapted to establish connection between different kinds of networks and necessary to communication. GW 1 and NS 2 are suitably interconnected to accommodate themselves to various kinds of networks to thereby establish connection between the mobile radio network and each of the different kinds of networks. In an alternative, the GW 1 may be combined with the NS 2 to constitute one system or apparatus.

Figure 2:
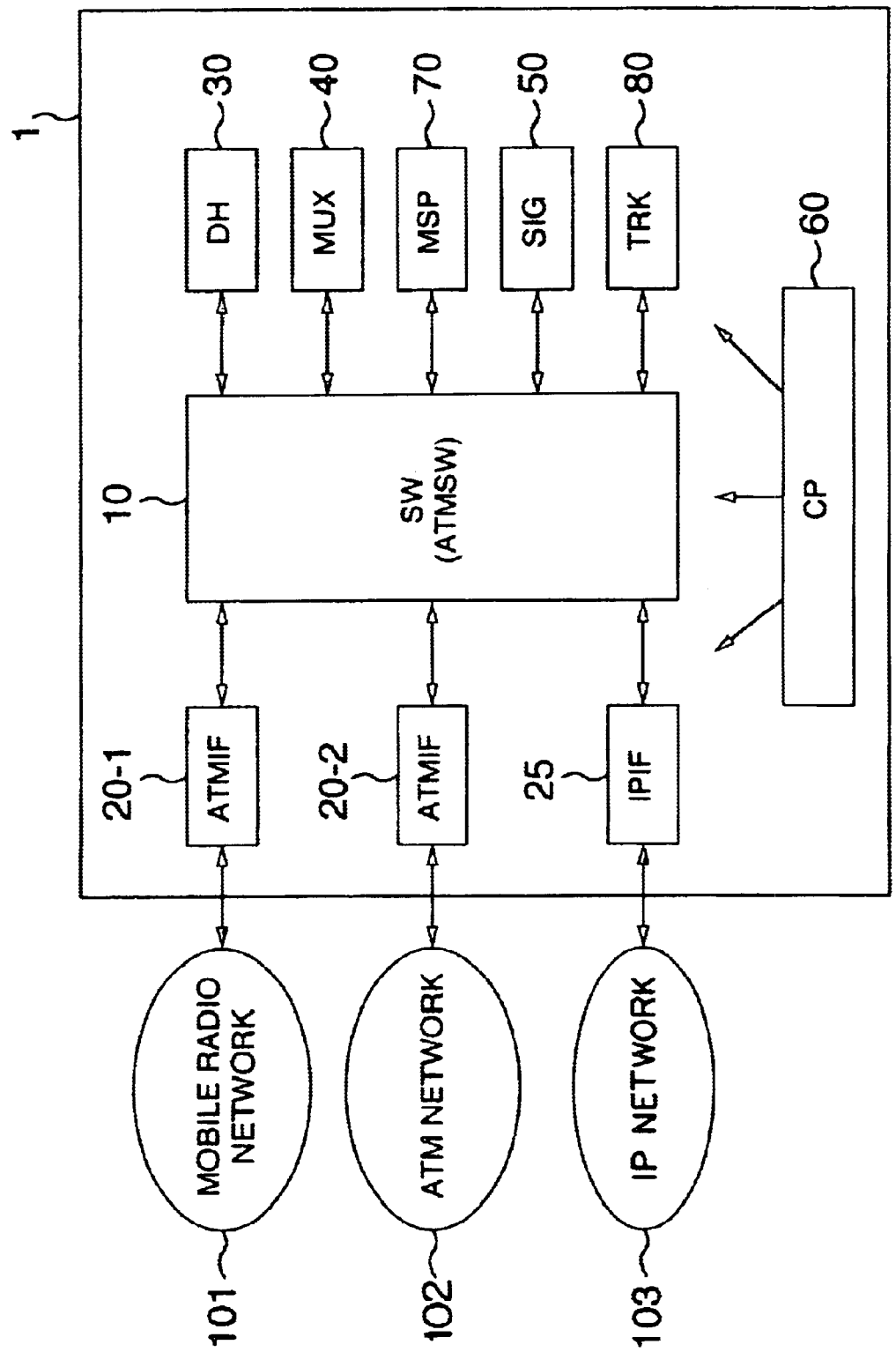
FIG. 2 is a block diagram showing an outline of construction of the network control system of the present invention.

FIG. 2 is a block diagram showing an outline of construction of the network control system of the present invention.

The network control system GW 1 comprises an ATM switch ATMSW 10, ATM interfaces ATMIF 20-1 through 20-2, a diversity handover processing apparatus DH 30 for executing diversity and handover, a multiplexer/demultiplexer MUX 40, a signal processor SIG 50, a controller CP 60, a multimedia signal processor or processing unit MSP 70 and a trunk unit TRK 80.

The ATM switch ATMSW 10 responds to signals formatted in the header of an ATM cell to switch various kinds of information (voice, image, data and the like) converted into the form of ATM cells and transmitted/received between users and to switch control information transmitted/received between a processor of the controller 60 and each unit (each functional block in the network, network interface and system). The GW 1 serves to establish connection to many mobile radio networks 101 and various kinds of networks. Preferably, the ATMSW 10 may be a switch which does not generate a cell loss. Accordingly, when a shared buffer ATM switch (see JP-A-2-1669, for example) is used as the ATMSW 10, an economical and highly reliable network control system can be realized. The ATMIF 20 has the function of interfacing with the ATM network. Additionally, an internet protocol/interface (IPIF) 25 having the function of interfacing with the IP network (e.g. Internet) may be provided. The SIG 50 has the function of transmitting/receiving control signals between the GW 1 and the mobile radio network, another GW 1 or the NS 2 or between the GW 1 and another functional block in the system will be described later. Alternatively, the SIG 50 may be incorporated in a suitable interface. The controller 60 is operative to control the whole of the network control system GW and controls the processing of control signals transmitted/received between each functional block and the interchange of the control information and the information between each functional block. The controller 60 transmits and receives the control information formatted in the ATM cell as described above but alternatively, it may transmit/receive the control signals directly to/from each functional block by using control signal lines. The trunk unit 80 includes such a unit as a copy trunk which copies ATM cells to provide copies necessary for paging a mobile station in the mobile radio network or performing broadcasting or multicasting to the mobile station.

The diversity handover processing apparatus DH 30 for execution of diversity handover or the like processing is adapted to prevent instantaneous interruption of talking and quality deterioration at the time that the mobile station MS moves during communication in the mobile radio network 101 and it executes diversity for selective combining of signals of high talking quality on the basis of signals transmitted/received to/from a plurality of base stations during handover or the like operation. The multiplexer/demultiplexer MUX 40 is operative to multiplex/demultiplex various kinds of control signals (call setup, location registration and handover processing) transmitted/ received to/from the mobile radio network, which are under consideration by ARIB (Association of Radio Industries and Businesses), and inter-user information (voice, image and data) transmitted/received between terminals and to transmit/receive the control signals and the information to/from each block of functions to be processed. The multimedia signal processor MSP 70 is a unit operative to transmit/receive the inter-user information between the mobile radio network and the terminal and to perform the necessary processing such as code conversion and ciphering and matching to the signal format in the existing network, for the purpose of warranting interconnection between mobile radio networks and between the mobile radio network and different kinds of networks.

Figure 3:
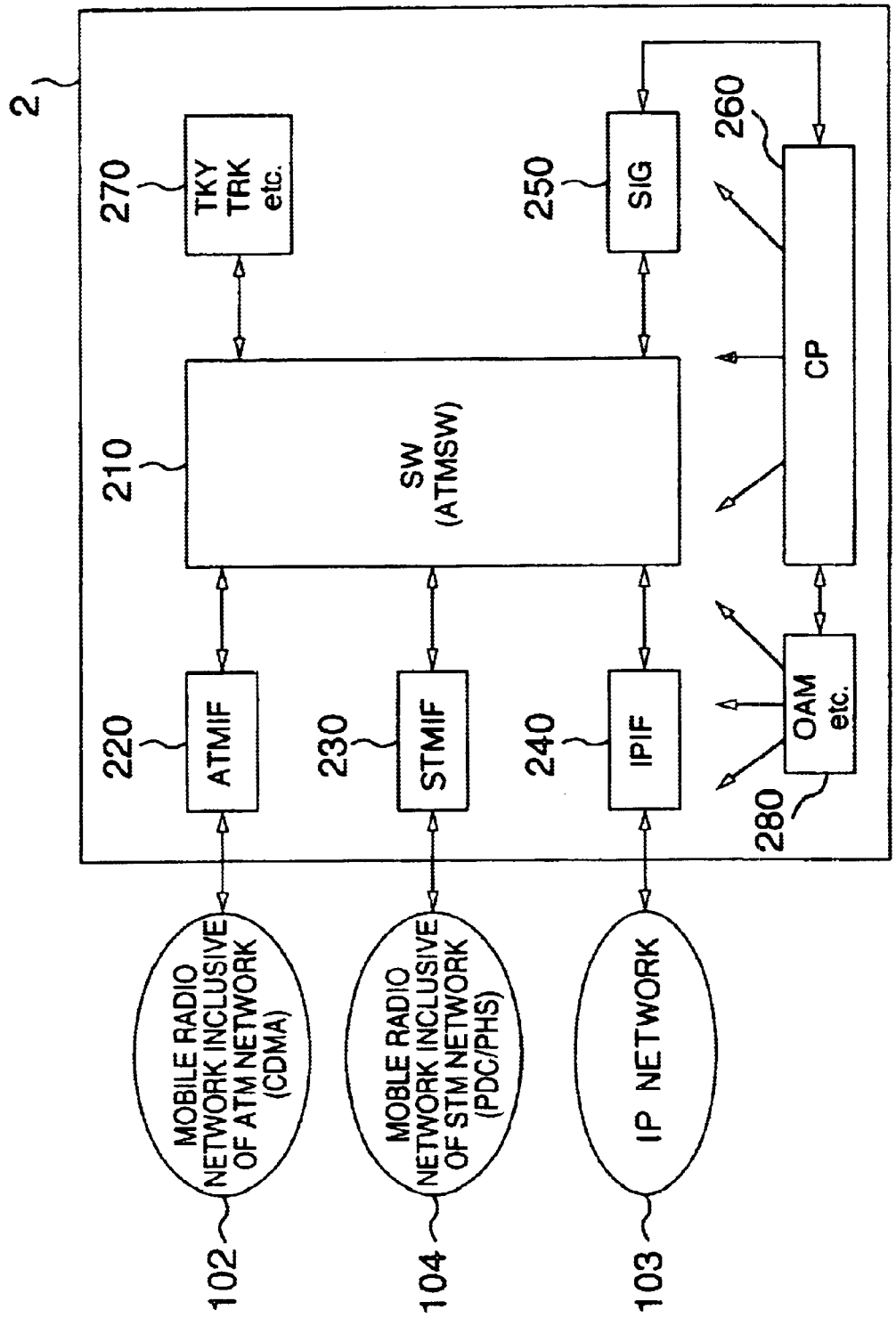
FIG. 3 is a block diagram showing an outline of a switching system.

FIG. 3 is a block diagram showing an outline of construction of the switching system NS 2.

The switching system NS 2 includes an ATM switch ATMSW 210, an ATM interface ATMIF 220, a STM interface STMIF 230, an IP interface IPIF 240, a signal processor SIG 250, a controller CP 260, a trunk unit TKY, TRK 270 and an operation and maintenance equipment OAM 280.

The ATM switch ATMSW 210 responds to signals formatted in the header of an ATM cell to interchange various kinds of information (voice, image and data) converted into the form of ATM cells and transmitted/received between the users and control information transmitted/received between a processor of the controller 260 and each unit (network or network interface unit). The ATMIF 220 has the function of interfacing with the ATM network. The STMIF 230 has the function of interfacing with the STM network. The IPIF 240 has the function of interfacing with the internet. The SIG 250 has the function of transmitting/receiving control signals to/from each network. A plurality of kinds of signal processors can be provided in accordance with necessary signal conversion, protocol conversion and the like. The controller 260 controls the whole of the switching system and controls the processing and switching of call control signals interchanged between the switching system and each network. The trunk unit 270 is a response unit such as a talkie or a unit having the function necessary for realizing various kinds of service. The operation and maintenance equipment 280 is a block for performing supervision/maintenance/management of the switching system and supply of clocks.

The present switching system is operative to establish connection to various kinds of networks and preferably. The ATMSW 210 should be a switch of large capacity and low cell loss rate. Accordingly, when the shared buffer ATM switch (see JP-A-2-1669, for example) or a cell division ATM switch (see JP-A-4-98937, for example) is used as the ATMSW 210, an economical and highly reliable switching system can be realized. In the present specification, a signal formatted to have control information or the like at an information area of an ATM cell is simply referred to as an in-channel.

For example, when a call is originated from a terminal in the ATM network 102 to a terminal in the STM network 104, a signal for controlling connection is supplied from the ATMIF 220 to the controller 260 through the ATMSW 210 and SIG 250. Then, the controller 260 confirms under the call connection control that the terminal in the STM network 104 is idle and then controls setting of the ATMIF 220 and the STMIF 230 by using the in-channel. Thereafter, operation is carried out in such a manner that information can be interchanged, converted and transmitted/received between the ATMIF 220 and the STMIF 230 through the ATMSW 210. In case a request for connection to the internet 103 is made by the terminal, the IPIF 240 is selected in place of the STMIF 230 and a similar operation proceeds. In the course of communication control, a necessary talkie or trunk can be selected from the trunk unit 270 so as to be connected to each network interface.

Next, construction and operation of the network control system of the present invention will be described in greater detail.

Figure 4:
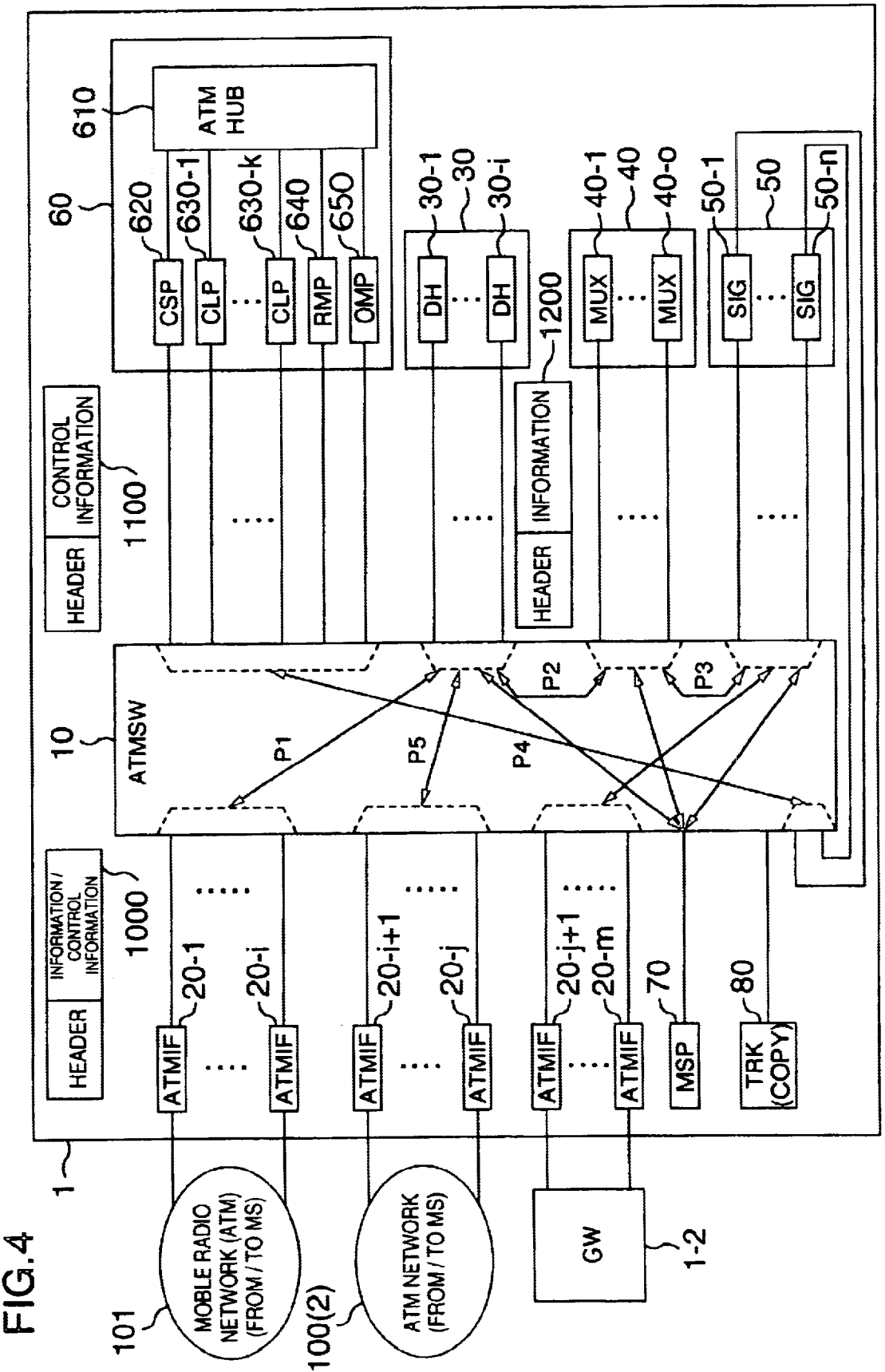
FIG. 4 is a block diagram showing details of construction of the network control system of the present invention.

FIG. 4 is a block diagram showing details of construction of the network control system of the present invention. In the figure, construction and configuration of the SIG 50 in the GW 1 is especially depicted in greater detail. Dotted line in the ATMSW 10 indicates that, for example, representative connection is incorporated in the ATMSW 10.

Structurally, in the network control system GW 1 of the present invention, a plurality of ATMIFs 20-1 to 20-i (associated with the mobile radio network 101), a plurality of ATMIFs 20-i+1 to 20-j (associated with the NSs 2) and a plurality of ATMIFs 20-j+1 to 20-m (associated with the GW5), these plural ATMIFs being used for connection to the mobile radio network 101, the NS 2 of the ATM network (multimedia network) 100 and the IP network (internet) 103, DHs 30-1 to 30-i, MUXs 40-1 to 40-o, SIGs 50-i to 50-n, the controller 60 comprised of a plurality of processors and operative to control the GW 1, the MSP 70 and the trunk unit 80 are each connected to the ATMSW 10 as illustrated.

The signal processors SIGs 50-1 to 50-n are connected, through the ATMSW 10, to the mobile station MS and base station BS in the mobile radio network 101, the ATM network 100 (NS 2), another GW 1, the IP network 103, other functional blocks DH 30, MUX 40, MSP 70 and so on in the system and they process control signals inputted/ outputted from/to each network and unit, more specifically, perform the communication processing such as converting the signal format of control signals and the protocol and performing the terminating process. A plurality of or a plurality of kinds of SIGs are accommodated in the ATMSW 10. In the present embodiment, the SIGs 50-1 to 50-n operate to absorb, convert and terminate differences in the signal format of signals transmitted/received to/from various networks and units and differences in communication protocol (to perform the communication process), thus transmitting/receiving the signals subject to the communication process to/from the controller 60 or transmitting/ receiving the signals subject to the communication process to/from each interface of other networks. In other words, the SIGs 50-1 to 50-n convert and absorb differences in control signals to convert the control signals into unified signals for the controller interfaces or convert information among the network interfaces to permit different networks to mutually transfer information. Thanks to the conversion operation by the SIGs 50-1 to 50-n, even when control signals of various formats subject to various procedures are inputted/outputted from/to each network, the controller 60 can analyze and process each control signal to operate software necessary for giving a communication service requested by the user such as a call process. If necessary, the SIGs 50-1 to 50-n may be of load dispersion type.

The controller 60 includes a resource management processor RMP 640 having the function of performing resource management of the whole of the network control system GW 1, an operation and maintenance processor OMP 650 having the function of interfacing to communication between the functional blocks for operation and maintenance in the GW 1 and an externally located operation/maintenance center, a common channel signaling handling processor (CSP) 620 having the function of processing the common channel signaling prescribed pursuant to recommendations by the ITU-T (International Telecommunication Union) and the function of interfacing to the common channel signaling network, and call handling processors (CLP5) 630 which terminate call control signals from each network to realize the function of controlling switching of multimedia calls. With the construction as above, the controller 60 controls the whole of the GW 1 by enabling each processor to share the function dispersion. More specifically, the controller 60 further includes an ATM HUB 610 which is an ATM switch dedicated to transfer of messages interchanged between each processor and the ATM HUB 610 effects mutual connection of each processor to control the GW 1. The CLPs 630-1 to 630-k may be constructed of a plurality of processors in accordance with the capacity (load) of the GW 1 and the load can be dispersed over the plurality of CLPs 630-1 to 630-k. Since the switch used for the ATM HUB 610 is operative to mutually connect each processor, it need not have so large a capacity as that of the ATMSW 10 and may include a switch similar to the ATMSW 10 but reduced in capacity. The ATM HUB 610 directly connects all of the processors through lines so that messages may be interchanged on the basis of addresses indicated by the cell headers.

The diversity handover processor DH 30 is adapted to accommodate the mobile radio network 101 to the multimedia network. When in the mobile radio network (CDMA) the diversity handover is carried out as the mobile station MS moves during communication, a plurality of paths are set between the station MS and the plurality of base stations. BS and between the station MS and the GW 1 and then information is transmitted/received. Under the circumstances, the DH 30 selects signals of high talking quality under a predetermined rule. In the network control system GW 1 of the present invention, the plurality of DHd 30-1 to 30-i are accommodated to the ATMSW 10. When a request for handover is made by the MS (or BS), any one of the SIGs 50 analyzes this request to cause the controller 60 to select/designate a suitable DH 30, so that the diversity handover can be carried out. With this construction, even when many paths are set during handover as many mobile stations MS move at high speeds in the mobile radio network, the GW 1 of the present invention can execute the diversity handover exactly and therefore, a communication system can be provided which can be freed from talking interruption during movement and deterioration in talking quality.

Further, the timing control is carried out between each unit as described above and for highly efficient data transmission from the BS to the MS in the mobile radio network 101, the DH 30 controls the timing for cell transmission. Since the timing for transmission from the BS to the MS sometimes differs for each CS, the timing is so controlled as to match each connection on the basis of mutually matched timings of the units. In some applications, of the signal from the MSP 70, a burst signal received in a unit of interleave block is smoothed and is then transferred to each MS in the mobile radio network 101 at a timing matching with each MS. In connection with forward signals, when the interleave process is carried out in the MSP 70, signals from the mobile radio network 101 are collected in a unit of interleave block and then transferred to the MSP 70. In case the MUX 40 handles a packet in the form of a plurality of ATM cells put together, a similar operation to that during the interleave in the DH 30 can proceed, so that signals in a unit of packet are smoothed and transferred to the mobile radio network 101 or conversely signals are collected in a unit of packet and then transferred to the MUX 40.

As reviewed by, for example, ARIB (Association of Radio Industries and Businesses), in addition to the control signals for connection control in the existing cable communication network, control signals (for location registration, handover process and so on) specific to various kinds of mobile radio networks are transmitted/received to/from the mobile station MS or the base station BS in the case of the mobile radio network. The bandwidth of information (signals) transmitted/received between terminals or stations is wide and a variety of kinds of inter-user information (voice, image and data) are transmitted/received. Besides, the control signals and the inter-user information are mixed (multiplexed) in the form of a packet and the packet is transmitted/received from/to the mobile station MS or base station BS at random timings and through random lines (ATMIFs 20). The multiplexer/demultiplexer MUM 40 is adapted to identify and multiplex/demultiplex the signals transmitted/received to/from the mobile radio networks in order that the control signals and the inter-user information of complicated formats transmitted/received to/from the mobile radio networks at various kinds of complicated timings can each be transmitted/received exactly to/from the functional blocks for processing. In the GW 1 of the present invention, the plurality of MUXs 40-1 to 40-o are accommodated to the ATMSW 10 and a great number of signals transmitted/received to/from the mobile radio networks are distributed to suitable MUXs 40 so as to be processed. In the MUXs, various kinds of control signals are separated from the inter-user information and the control information is transmitted/received to/from a suitable SIG 50 and processed by the controller 60 so that the operation (control of the network) of the GW 1 may proceed to execute mutual connection of the mobile radio networks or connection between different networks. The inter-user information is transmitted/received to/from a destination unit on the basis of the aforementioned connection control.

Generally, in the mobile radio network (CDMA, W-CDMA), the bandwidth of the information (signals) transmitted/received to/from the user terminal is broad to permit various kinds of inter-user information (voice, image and data) to be transmitted/received and hence various kinds of communication services can be presented. On the other hand, even in the existing network, there is such a network as the ATM network which can handle multimedia through the wide bandwidth communication and can offer various kinds of communication services. The multimedia signal processor MSP 70 transmits/receives information between the station in the mobile radio network and the user and processes the inter-user information by coding and ciphering to ensure that various kinds of communication services can be offered.

Attentively, in order to assure communication with different kinds of terminals, the MSP 70 converts the rule of coding/ciphering and the media. Further, to warrant mutual connection with terminals of the different kinds of existing networks, the MSP 70 carries out the necessary processing such as code conversion/ciphering and matching with the signal format in the existing network. In the GW 1 of the present invention, the MSP 70 as above is accommodated to the ATMSW 10 so that the inter-user information transmitted/received, in various formats, to/from various destinations via many lines may once be collected through the ATMSW 10 and processed collectively to thereby realize an economical system. Structurally, a system may be provided in which the MSP 70 is a separate unit installed externally of the GW 1 and a plurality of GWs 1 share the MSP 70.

Excepting messages transferred for control operation between a plurality of processors, all of the signals from the aforementioned individual functional blocks (each network interface, SIG and each processor) are converted into ATM cells 1000, 1100 and 1200 and transferred between the individual blocks by way of logical paths P1 to PS (paths set up between dotted line ports in the ATMSW 10). ATM cell 1000 includes a header and information/control information, ATM cell 1100 includes header and control information and ATM cell 1200 includes header and information. Concretely, as described in JPA-63-72293, when the individual functional blocks assign destination information to the headers of the ATM cell, the ATMSW 10 performs self-routing of the ATM cell to a functional block, to which the information is destined, on the basis of the header information through the logical paths. As described in JP-A-3-218142, for assignment of the destination information in the functional blocks, each of the individual functional blocks has a table stored with destination information in advance and when a signal to be transmitted is inputted, the destination information is assigned to the header by consulting the table. The contents of each table can be set during installation or change of construction of the GW 1 by means of the operation and maintenance equipment in the system or a suitable management unit (not shown).

When the signal is transferred from the base station BS to the network control system GW 1 in a format of, for example, AAL type 2 prescribed by the ITU-T 1.363.2, that is, when CPS (Common Part Sublayer) packet signals from a plurality of stations MS are multiplexed on one ATM connection, the individual CPS (Common Part Sublayer) packets are separated from each other by means of the ATMIF 20-1, each CPS packet is filled in the payload of an ATM cell and destination information given to the individual CPS packets channel by channel is assigned to the ATM cell. Through this, the signal of each station MS can be subjected to routing by means of the ATMSW 10 and besides, in the DH 30, the signals of each station MS can be discriminated from each other. Conversely, signals from the ATMSW 10 to the ATMIF 20-1 are multiplexed on an ATM cell on the basis of the ITU-T I.363.2 and transferred to the BS. The contents of each table is set during installation or change of construction of the GW 1 by means of the operation and maintenance equipment 80 in the system, a suitable management unit (not shown) or the CP 60 which analyzes the control signals extracted by the MUM 40 and the SIG 50. For example, in case a signal of a certain station MS is processed by the DH 30-1 and thereafter this station MS undergoes diversity handover to communicate with a plurality of BSs, the selective combining process and the copy process cannot be carried out unless signals to be connected at that time are inputted to the DH 30-1. Thus, the CP 60 sets the connection of an object of the diversity handover process in the ATMIF 20-1 such that the connection undergoes routing to the same one of DH 30-1, . . . , 30-i.

(2) Diversity Handover Processor

Next, the diversity handover processor DH 30 of the present invention will be described in greater detail. As an example, the DH 30 using an address chain type shared buffer switch will first be described and then the DH 30 using an address FIFO type shared buffer switch will be described.

In the DH 30-1 of the present invention, a shared buffer switch is used and firstly, a shared buffer method will be described. In the shared buffer method, the queue length is not fixed differing from that in the separated buffer method.

Accordingly, when, for example, a voice data is stored for 20 ms before being read and N-ISDN data for 80 ms, all of the queue lengths must be set such that the signal for 80 ms can be stored or the queue length must be set in respect of each call and the memory resources for the set queue lengths must be assured in the separated buffer method. In case all of the queues for 80 ms are assured, a great number of memories are required, and in case, the queue length is set in respect of each call, each queue length must be set dynamically and the control operation becomes complicated. On the other hand, in the shared buffer method, the queue length need not be set regardless of the queue being either for voice or N-ISDN and if the input is random traffic, the effect of sharing memory can be expected and the buffer amount can be smaller than in the separated buffer method. In this example, the voice signal is described as being transmitted through N-ISDN but even for a packet having a variable length, the effect of sharing memory can be expected similarly. With the shared buffer memory adopted, a burst of a length exceeding one ATM cell can be dealt with by dynamically allotting memories and besides, when a plurality of cells are stored so as to be handled as one burst and are then transferred, the memory allotment can be dealt with similarly.

Next, concrete construction and operation of the diversity handover processing apparatus DH 30 will be described. The DH 30-1 includes a shared buffer memory 301 and a section for controlling the same which are exemplified by eliminating the multiplexer and demultiplexer from a shared buffer ATM switch described in Japanese patent No. 2569118 "A Switching System and a Method of Constructing the Same" or JP-A-6-120974 "A Shared Buffer ATM Switch having the Copy Function and a Copying Method".

Figure 5:
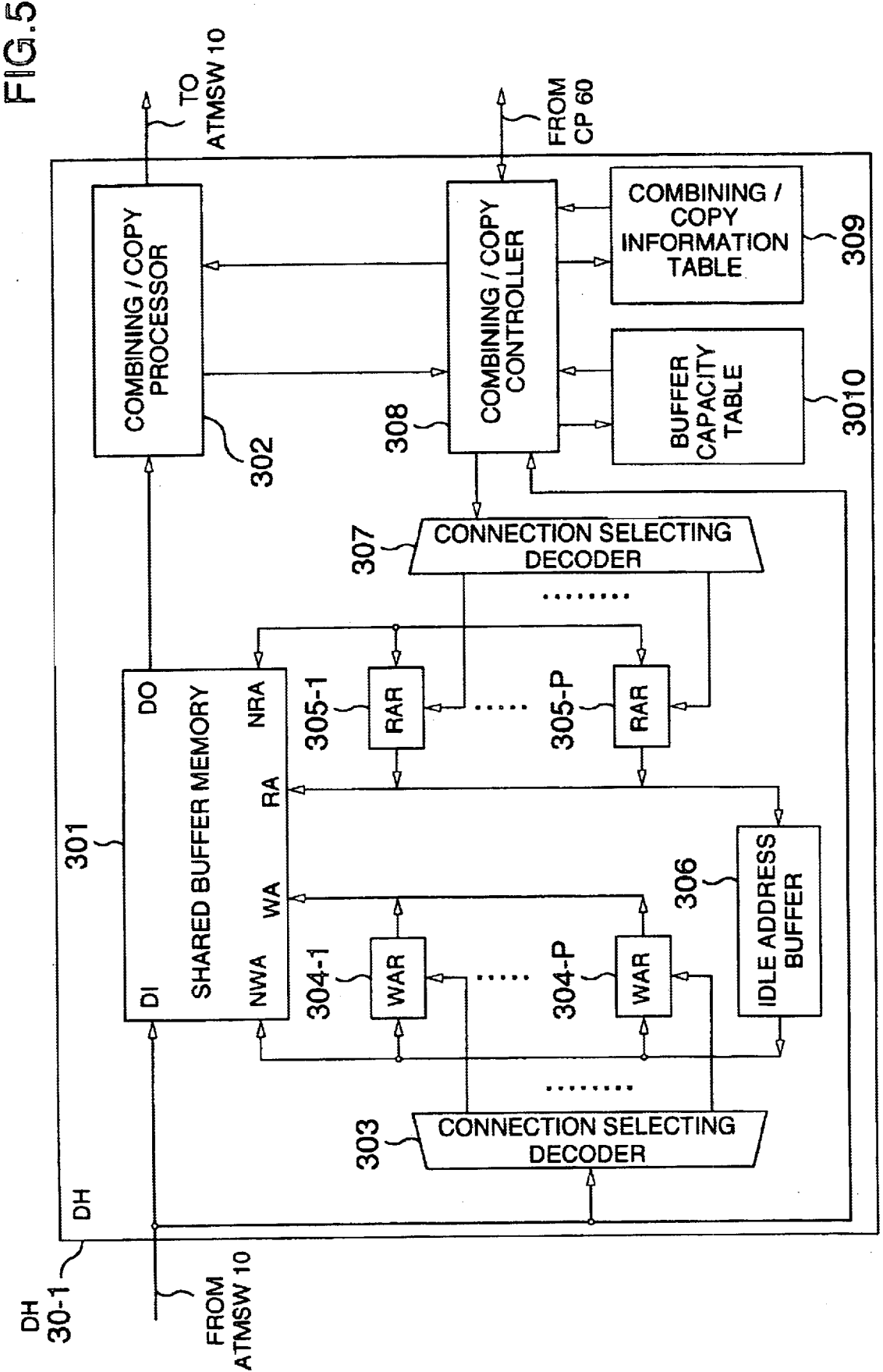
FIG. 5 is a block diagram showing the construction of a diversity handover processing apparatus using address chain type shared buffer switch according to the invention.

FIG. 5 is a block diagram showing an example of construction of the diversity handover processing apparatus DH 30-1 using address chain type shared buffer switch according to the present invention.

The diversity handover processing apparatus DH 30-1 includes a shared buffer memory 301 for storing inputted ATM cells, a combining/copy processor 302 for performing the selective combining process or the copy process of read-out ATM cells, a connection selecting decoder 303 for analyzing destination signals of the inputted ATM cells, write address registers WAR 304-1, 304-P for storing write addresses of the ATM cells in respect of each connection, read address registers RAR 305-1, . . . 305-P for storing read addresses of the ATM cells in respect of each connection, an idle address buffer 306 for storing addresses unused in the shared buffer memory 301, a connection selecting decoder 307 for designating the read address registers PAR 305-1, . . . , 305-P on the basis of designated connection numbers, a combining/copy information table 309 having information for combining/copy in respect of each connection, a combining/copy controller 308 for reading the information possessed by the combining/copy information table 309 at timings from the CP 60 and responding to the read information to read a corresponding ATM cell from the shared buffer memory 301 so as to command the read-out ATM cell to be processed, and a buffer capacity table 3010 for managing the number of blocks each consisting of a plurality of ATM cells stored in the shared buffer memory 301. A FIFO (First in—First out) may be used as the idle address buffer 306 or alternatively, a suitable buffer accessible at random can be used. The CP 60 may include a table for conversion between the mobile station name and the station local ID and by using the converted station local ID in place of the mobile station name, the processing may be executed suitably or the station local ID may be stored in the memory table such as the combining/copy information table 309 or buffer capacity table 3010.

Figure 9:
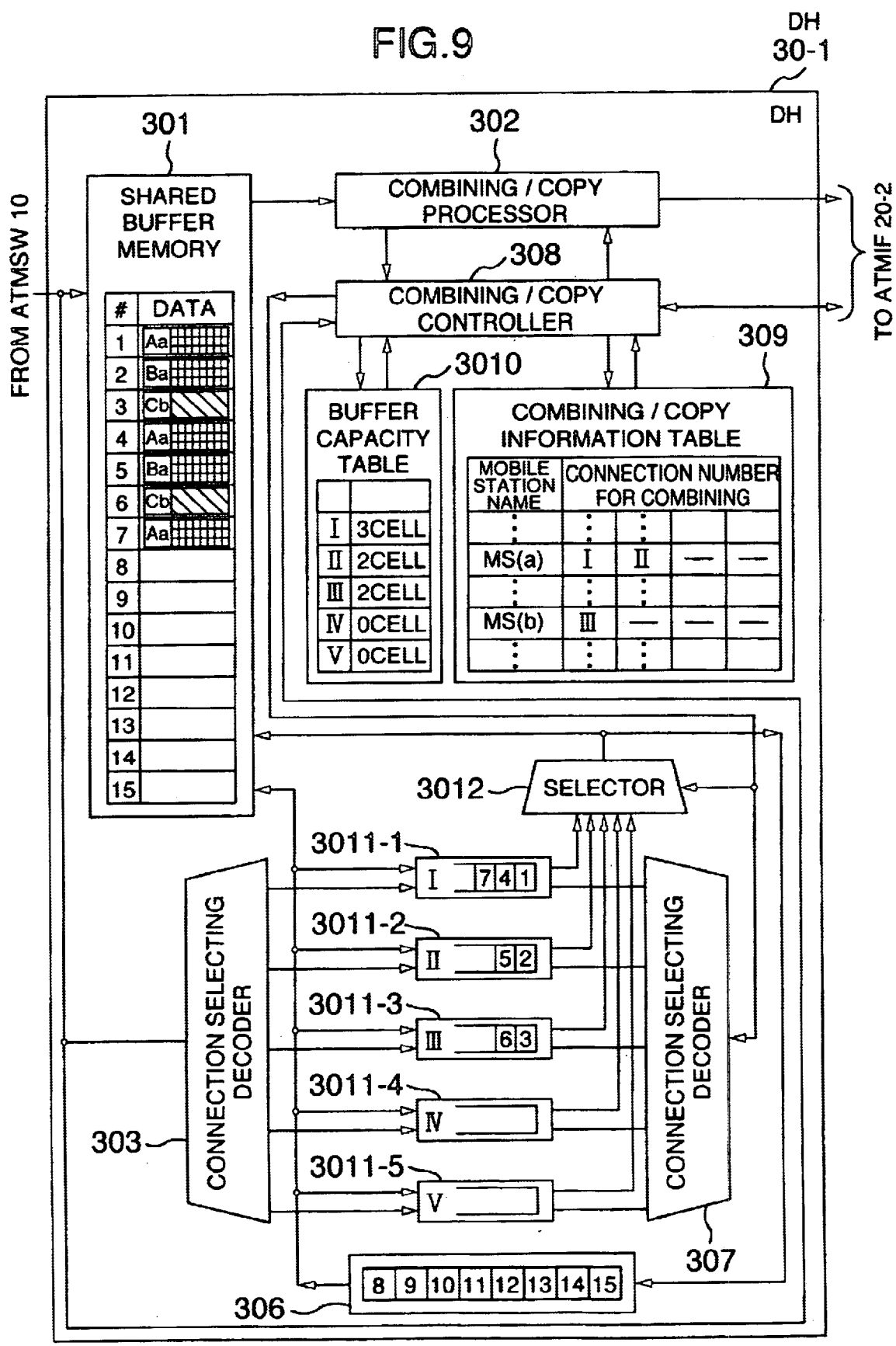
FIG. 9 is a diagram for explaining a reverse signal process in the diversity handover processing apparatus when the mobile station moves.
Figure 21:
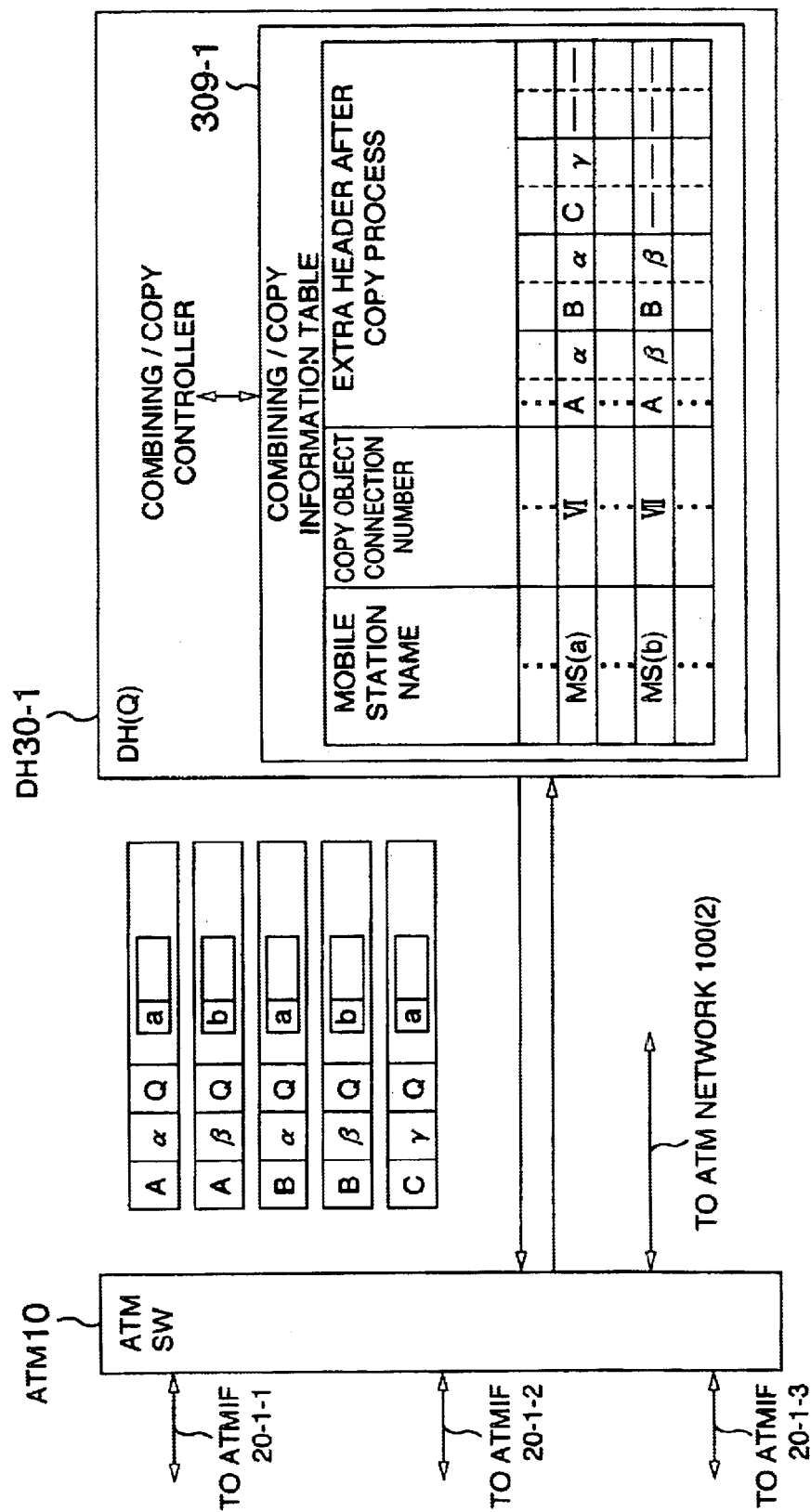
FIG. 21 is a diagram for explaining a copy process of forward signal.

In the ATM cell inputted from the ATM switch ATMSW 10 to the DH 30-1, each CS can be identified in accordance with the destination information as described hereinbefore. Each piece of destination information are made to correspond to each connection in the DH 30-1 and are written in the shared buffer memory 301 so as to be managed in respect of each connection. During the diversity handover, a plurality of ATM cells having different destination information reach from the same station CS and they are managed in respect of the destination information. Then, an ATM cell corresponding to a connection designated by the read side is read and transferred to the ATMSW 10 after being subjected to the selective combining process or copy process or without being subjected to these processes. It depends on information in the combining/copy information table 309 how the read-out ATM cell is handled. In some applications, a plurality of ATM cells form one block and the burst process in a unit of block is required. In that case, the number of blocks in each connection in the shared buffer memory 301 is managed by the combining/copy information table 309. The information stored in the combining/copy information table 309 is used for combining by including mobile station name and connection number as shown in FIG. 9 and is used for copy by including mobile station name and connection number as shown in FIG. 21.

In connection with the shared buffer memory 301, the construction for write and read will be described.

Firstly, write operation to the shared buffer memory 301 will be described. Destination information of an ATM cell inputted from the ATMSW 10 is analyzed by the connection selecting decoder 303 and a connection number to be stored is determined. One of the write address registers WAR 304-1, . . . 304-P corresponding to the connection number is selected and a write address is obtained in accordance with the selected write address register. The write address is inputted in advance from the idle address buffer 306. By using this write address, the ATM cell is written into the shared buffer memory 301. At that time, the address is read out from the idle address buffer 306 and this address, together with the aforementioned ATM cell, is written into the shared buffer memory 301. The address read out of the idle address buffer 306 is also written into the previously selected write address register WAR 304. The address has been written along with the ATM cell to indicate a storing address of the next ATM cell in the same connection as that for the previous ATM cell. When the ATM cell is read in the read operation, the address is read concurrently and the read address thus indicates an address of the next ATM cell in the same connection, showing that an ATM cell at that address will be read during the next read operation. By reading ATM cells at the addresses sequentially read out in this manner, the ATM cells in the same connection can be read out sequentially.

Next, the read operation from the shared buffer memory 301 will be described. For reading an ATM cell, one of the read address registers RARs 305-1, . . . 305-P is selected by means of the connection selecting decoder 307 under the control of the combining/copy controller 308 to obtain a read address and by using this address as a read address of the shared buffer memory 301, the ATM cell can be read. The address used as the read address is sent to the idle address buffer 306 and will be used again as a write address. The address read out concurrently with the ATM cell is stored in the read address register RAR 305 selected in the aforementioned manner. As described in connection with the write operation, an address indicated subsequently by the read address register RAR 305 designates the next ATM cell in the same connection.

Through the address control as above, the number of ATM cells in one connection storable by the shared buffer memory 301 is not limited and besides, even when the number of stored ATM cells is different connection by connection, the number of storing ATM cells can comply without resort to designation by the CP 60 and in addition, the shared buffer memory 301 can be used efficiently. The addresses can be managed by a method using an address FIFO group as described in Japanese patent No. 2569118 "A Switching System and a Method of Constructing the Same" and this method will be described later with reference to FIG. 6.

In the combining/copy controller-308, a counter is operated on the basis of a timing signal from the CP 60 and the information is read out from the combining/copy information table 309 in accordance with a value of the counter. During read/write of the ATM cell, the buffer capacity table 3010 is controlled.

The buffer capacity table 3010 manages the number of ATM cells stored in the shared buffer memory 301 in respect of each connection and the number of blocks each consisting of a plurality of ATM cells and it is rewritten by the CP 60 when a call is connected or handover is added or deleted. The buffer capacity table 3010 stores, in respect of each connection, type of service such as, for example, a service in which the read is required to be done in a burst fashion in a unit of interleave block, a service not subject to interleave and a service in which the packet length is indefinite but the burst read is required. This service type is rewritten when a call is connected from the CP 60 or handover is added or deleted. When an ATM cell from the ATMSW 10 reaches the DH 30-1, the ATM cell is inputted to the combining/copy controller 306 and a service indicated by a connection number corresponding to destination information in the ATM cell is read out from the buffer capacity table 3010. In case this service shows that the interleave is not to be effected, the block of a plurality of ATM cells need not be taken into consideration and the number of ATM cells managed in the table can be increased in accordance with the number of the written ATM cells. In case the service is one in which read is required to be done in a burst fashion in a unit of interleave block, the number of blocks managed in the table may be increased only when an ATM cell indicative of the end of the block reaches. In case the service is one in which the packet length is indefinite but the burst read is needed, the number of blocks managed in the table may be increased only when an ATM cell indicative of the end of the packet reaches. When an ATM cell or ATM cells are read in a unit of block, the corresponding number is subtracted from the number of ATM cells or blocks of the object connection in the buffer capacity table 3010.

Figure 20:
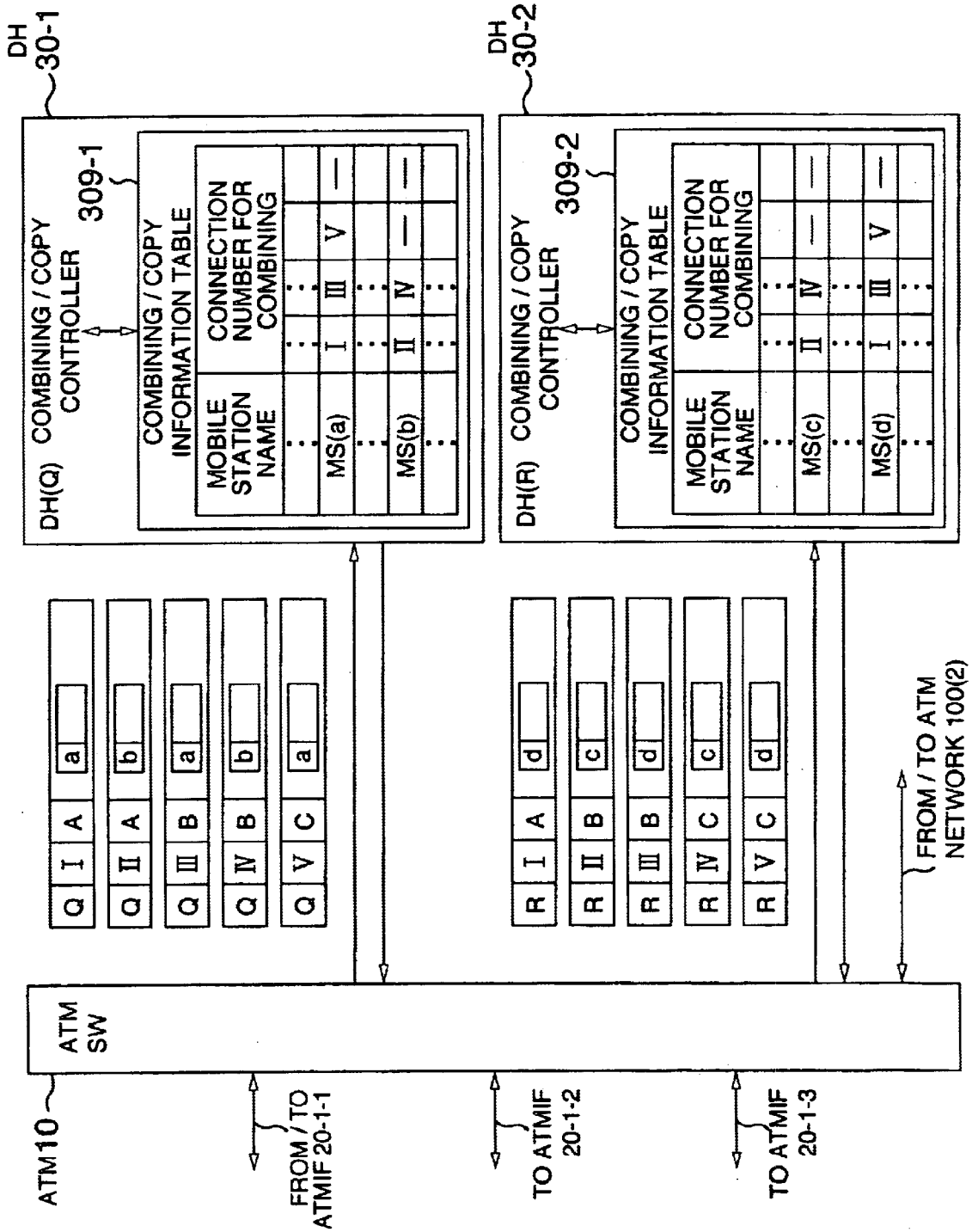
FIG. 20 is a diagram for explaining individual process tables and data formats on the diversity handover processing apparatus side in the network control system.

The combining/copy information table 309 is rewritten by the CP 60 when a call is connected or handover is added or deleted. It is indicated in the diversity handover processing apparatus DH 30 which the process must be carried out for a connection of a process object in order to process or deal with signals from the BS to the GW 1 or vice versa. FIG. 20 to be described later shows an example of the signal process from the BS to the GW 1 and FIG. 21 shows an example of the signal process from the GW 1 to the BS. In case the signal from the BS to the GW 1 is processed, it is registered in the combining/copy information table 309 whether selective combining for diversity handover is effected. When the selective combining is to be effected, two or more object connection numbers are registered but when the selective combining is not to be effected, one connection is registered. In some applications, a plurality of ATM cells form one block and are read in a burst fashion and in a unit of block. In that case, for the purpose of managing the number of blocks stored in the shared buffer memory 301, the service type of the object connection is registered. For example, the service is classified into a service in which the read is required to be effected in a burst fashion in a unit of interleave block, a service in which the interleave is not carried out and a service in which the packet length is indefinite but burst read is required. Further, new destination information to be exchanged after the selective combining is registered. This destination information can be used even when the selective combining is not effected.

In the network control system GW 1, when the selective combining for diversity handover from the BS to the GW 1 is added, destination information for a connection for which added handover is destined is registered from the CP 60 to the ATMIF 20. At that time, the destination is determined in such a manner that transfer is directed to the same DH 30 as that in the handover originator. Then, information at a connection number unused in the object of the DH 30 is also registered. In the combining/copy information table 309, the connection of the handover originator has already been added but a connection of a handover destination allotted as described above is additionally registered and effectuation of the selective combining process is registered. Conversely, in the course of erase of the selective combining for the diversity handover, operation is carried out inversely. On the other hand, when copy for the diversity handover from the GW 1 to the BS is added in the GW 1, destination information is added by the number of added copies to the combining/copy information table 309 in which the object connection is registered. During deletion, operation is carried out inversely.

The controller CP 60 transfers the timing mutually controlled by each unit to the combining/copy controller 308. In the combining/copy controller 308, the counter is operated on the basis of the timing, each processing item in the combining/copy information table 309 are read on the basis of values of the counter and data of connections designated by the read-out items are read, so that in the DH 30-1, data of the designated connection can be read at a timing equaling the sum of the timing given by the CP 60 and a time delay or offset by the counter. If the timing given by the CP 60 equals the frame period in the radio interval, the time point at which a signal of a certain connection is read in the DH 30-1 equals the sum of the frame sectioning time and the time delay and read operation can be effected at a period equal to the frame period.

Figure 6:
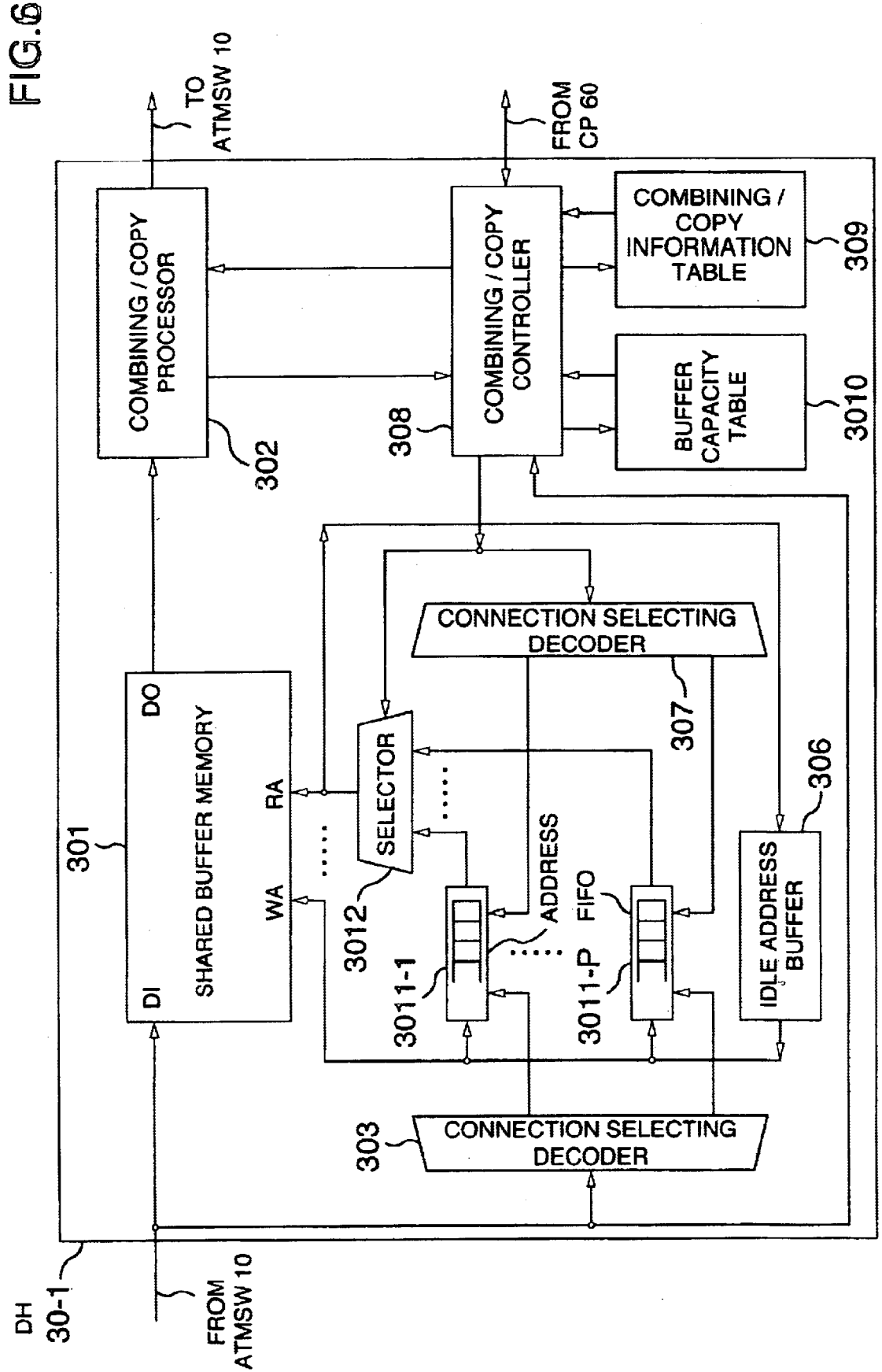
FIG. 6 is a block diagram showing the construction of a diversity handover processing apparatus using address FIFO type shared buffer switch according to the invention.

FIG. 6 is a block diagram showing an example of construction of a diversity handover processing apparatus DH 30-1 using address FIFO type shared buffer switch according to the present invention. As an example, this shared buffer switch can also be constructed as disclosed in Japanese patent No. 2569118 "A Switching System and a Method of Constructing the Same".

The diversity handover processing apparatus DH 30-1 includes a shared buffer memory 301 for storing inputted ATM cells, a combining/copy processor 302 for performing the selective combining or copy process of readout ATM cells, a connection selecting decoder 303 for analyzing destination signals of the inputted ATM cells, address FIFOs 3011-1, . . . , 3011-P for storing read addresses for the ATM cells in respect of each connection, a selector 3012 for selecting one of the address FIFOs 3011-1, . . . , 3011-P, an idle address buffer 306 for storing addresses unused in the shared buffer memory 301, a connection selecting decoder 307 for designating the address FIFOs 3011-1 to 3011-P on the basis of designated connection numbers, a combining/copy information table 309 having information for the combining/copy process in respect of the individual connections, a combining/copy controller 308 for reading the combining/copy information table 309 in accordance with timings from the CP 60, reading corresponding ATM cells in accordance with the information read out from the table 309 and commanding read-out ATM cells to be processed, and a buffer capacity table 3010 for managing the number of blocks each consisting of a plurality of cells stored in the shared buffer memory 301.

Excepting the address FIFOs 3011-1, . . . , 3011 P, this type of shared buffer switch has the construction and operation similar to that of the previously described address chain type shared buffer switch. In the DH 30-1, when one ATM cell is inputted from the ATMSW 10, one address is read out from the idle address buffer 306 and the inputted ATM cell is stored at a location indicated by the read-out address in the shared buffer memory 301. A connection indicated by an extra header of the ATM cell is analyzed and the previously read address is inputted to an address FIFO 3011 corresponding to the analyzed connection. Therefore, by reading the ATM cell from the shared buffer memory 301 in accordance with the address read out from the address FIFO 3011, it is possible to read the ATM cell corresponding to the connection.

(3) Processing of Signals Between the Base Station BS and the Network Control System GW 1 Carried Out by Means of the DH 30-1

Here, processing of signals between the BS and the GW 1 will be described.

Firstly, an instance in which signals from the BS to the GW 1 are processed will be described. In case the selective combining is carried out, signals of a plurality of object connections are transferred from the shared buffer memory 301 to the combining/copy processor 302. Values of quality information written in read-out ATM cells corresponding to the plurality of connections are compared with each other, and an ATM cell having the best quality is given new destination information and then delivered to the ATMSW 10. At that time, ATM cells having bad qualities are discarded.

If the interleave is not effected, only one ATM cell is read out from an object connection and subjected to the selective combining process. In the case of a service in which the read is required to be done in a burst fashion in a unit of interleave block, one block consisting of a plurality of ATM cells is read out and subjected to the selective combining process. In this case, the selective combining is carried out by either a method of performing processing in a unit of ATM cell or a method of performing selection in a unit of read-out block. Even a service in which the packet length is indefinite but the burst read is needed can be processed similarly to the service in which the interleave is effected. But, the end position of packet is detected by the combining/copy processor 302 and completion of reading of one packet is transferred to the combining/copy controller 308 so that control may proceed to stop read operation from the object connection at that time. Data in one radio frame interval has been described so far as being stored in one ATM cell but even when data in one radio frame interval extends over a plurality of ATM cells, a process similar to the above can also be carried out. More particularly, for example, in the case of a service in which the interleave is not effected, a plurality of ATM cells are read and they can be processed collectively on the basis of one quality information piece contained in these ATM cells. The number of ATM cells over which the data in one radio frame interval extends can be indicated by the combining/copy information table 309 or the buffer capacity table 3010 under the direction of the CP 60 or alternatively can be detected by the combining/copy processor during read operation.

When one signal per connection may be read during one frame period of radio interval, that signal can be read at the timing equaling the sum of the timing from the CP 60 and the time delay as described previously but when the read is effected in a unit of block or over a plurality of ATM cells as described previously, read operation is started at the time that storage of the plurality of ATM cells has been completed.

Figure 7:
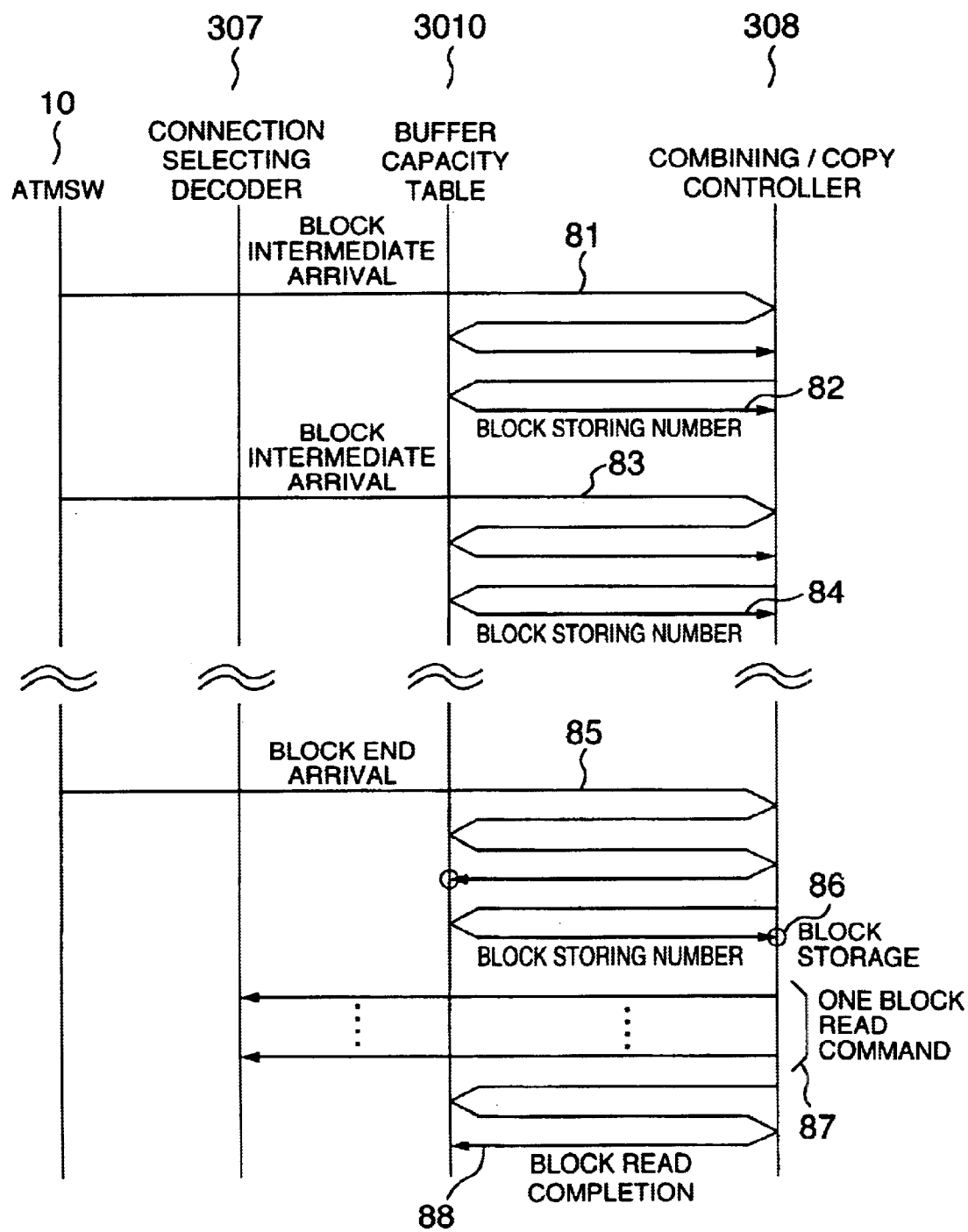
FIG. 7 is a diagram for explaining a process in the diversity handover processing apparatus carried out when a unit of block or a plurality of ATM cells are read.

FIG. 7 shows an example where one block unit or a plurality of ATM cells are read. In the example of FIG. 7, operation for one connection is extracted and the diversity/handover is not carried out.

When ATM cells from the ATM switch ATMSW 10 reach the DH 30-1, they are transferred to the combining/copy controller 308 and destination information is analyzed. In respect of a connection indicated by the destination information, the buffer capacity table 3010 is read and service in the connection is retrieved. The format of a bit indicative of the end of block differs depending on service but, in accordance with a service now read out, it is decided whether the block is at the end and if the block is not at the end, it is determined that the number of blocks stored in the shared buffer memory 301 is not increased and the value of the buffer capacity table 3010 is not updated. But depending on the type of service, the beginning, intermediate and end of block can be decided or alternatively they are managed by the sequence number. Accordingly, a method may be employed in which information for identifying the "beginning", "intermediate" or "end" is updated in the buffer capacity table 3010 or alternatively the sequence number is updated in the table 3010. The method as above is effective to deal with the event that a signal indicative of the "end" is lacked in the transmission path.

In FIG. 7, at the block intermediate arrival (sequence 81), the end of block does not arrive and the number of cells in the buffer capacity table 3010 is not updated. Thereafter, as retrieval of the combining/copy information table 309 proceeds in accordance with the value of the counter controlled at the timing from the CP 60, an object connection number is read and the combining/copy controller 308 retrieves a block storing number in the buffer capacity table 3010 in respect of the object connection (sequence 82). At that time, no block is stored and therefore, no ATM cell is read out from the shared buffer memory 301. Similar operation proceeds in sequences 83 and 84. Subsequently, when the block is at the end in the phase of the block end arrival (sequence 85), analysis is carried out in a way similar to the above and thereafter, the cell number in the buffer capacity table 3010 is updated and the block storing number is increased by one. Thereafter, if completion of storage of one block is confirmed through retrieval of the block storing number (sequence 86), the combining/copy controller 308 commands the connection selecting decoder 307 to read one block, consisting of a plurality of ATM cells, from the shared buffer memory 301. At that time, since sequential read from the object connection is effected, the same connection number is designated by the number of read-out ATM cells in the one block read command (sequence 87). After the read operation, the block storing number is decreased by one and the block read completion (sequence 88) is determined, thus decreasing the block storing number in the buffer capacity table 3010 by one. After the read process as above, the combining/copy processor 302 rewrites the destination information to new one read out of the combining/copy information table 309 and transfers the ATM cells to the ATMSW 10.

In this example, the diversity handover is not effected. But when the diversity handover is carried out, the retrieval of the block storing number must be performed in respect of a plurality of object connections. Exemplarily, a method is available in which the read operation is carried out only when storage of blocks in all of the object connections is completed or a method is used in which the read operation is carried out when completion of storage of some blocks in the object connections is confirmed.

Next, processing of signals from the GW 1 to the BS will be described. When the CP 60 commands to an object connection that a signal from the GW 1 to the BS should be processed, the combining/copy information table 309 is consulted. It is registered in the combining/copy information table 309 whether copy of the diversity handover is carried out subsequently. In case copy is to be carried out, new destination information to be exchanged after Copy is registered by the number of copying sheets. The storing number in the shared buffer memory 301 is managed by the buffer capacity table 3010 and the read operation is carried out when ATM cells exist.

In copying, a signal of an object connection is transferred from the shared buffer memory 301 to the combining/copy processor 302. An ATM cell directed to the read-out connection is copied and the copies are each assigned with destination information and transferred to the ATMSW 10. The case where one radio data unit is stored in one ATM cell is described but even when one radio data unit extends over a plurality of ATM cells, the copy process can be carried out similarly. In the BS, however, one data unit is needed within one frame time in radio interval and therefore, during transfer of data to the BS side, a plurality of ATM cells are read and copied. Whether one radio data extends over some ATM cells may be indicated by the combining/copy information table 309 or buffer capacity table 3010 under the direction of the CP 60 or may be detected by the combining/copy processor 302 during read operation. After the read process, the combining/copy processor 302 rewrites the headers of the ATM cells to be copied by using new destination information which has already been read out from the synthesis/copy information table 309 and the copies are transferred to the ATMSW 10.

Here, the transfer of data of block as below will be described by making reference to concrete examples.
1) In the case of a block divided into "beginning", "intermediate" and "end".
2) In the case where one packet is too large to be carried on one cell.

The following description will be given on the assumption that for example, data of CPS packets is transferred every 10 ms.

Firstly, when a signal completing one block within, for example, 80 ms is transferred in the case of 1) above, an identifier indicative of "beginning" is assigned to CPS packets initially transmitted within 10 ms, an identifier indicative of "intermediate" is assigned to CPS packets transmitted between 20 ms and 70 ms and an identifier indicative of "end" is assigned to CPS packets finally transmitted at a time point of 80 ms. This enables the CPS packet receiving side to assemble one block by using 8 CPS packets ranging from "beginning" to "end". Since the quality information for selective combining is assigned to the individual CPS packets transmitted every 10 ms, the selective combining process can be executed without paying special attention to blocks transmitted every 80 ms. But a method may be employed in which in order to omit the selective combining process, only the CPS packet at the "beginning" is decided and the decision result is used for processing the seven CPS packets subsequently read.

Next, in the case of 2) above, when the length of one CPS packet within the 10 ms interval exceeds a payload of one ATM cell, this CPS packet must be divided and transferred while being filled in ATM cells. For example, the data transfer amount is 64 kbit/s, 640 bits take place per 10 ms, that is, the payload for one CPS packet corresponds to a length of 80 bytes (640 bits). In that case, CPS packets generated every 10 ms must be transferred on two ATM cells. The reason for this is that the payload of an ATM cell is 48 bytes but a few bytes are used for the AAL type 2 and all of them cannot be used and that 64 kbit/s are taken, for instance, but in essentiality, they correspond to the transfer amount between the BS and the GW and not between the mobile station and the fixed telephone.

One piece of quality information within the radio interval is assigned to one CPS packet and therefore, when one packet is divided into two ATM cells as described above, the quality information is generally assigned to CPS packet data contained in the initial ATM cell. Accordingly, during the selective combining, control operation is carried out such that two cells are read out of each object connection, quality information assigned to the initial ATM cell in a connection is compared with that assigned to the initial ATM cell in another connection, a connection of the best quality is determined, and data of two cells from that connection are transferred to the succeeding stage.

In the case of copy of ATM cell, too, two cells are first read out of one object connection, the two cells are then copied and extra headers are assigned to the copies. While, in the above example, division into two cells has been described, division into three or more cells is conceivable. In such a division, each ATM cell are assigned with identifiers indicating the "beginning", "intermediate" and "end", respectively, and hence the ATM cells can be put together to form one CPS packet.

As described above, even when different kinds of services coexist and the buffer capacity for absorption of burst is different for each connection, the DH 30-1 can handle flexibly and there is no need of providing any unwanted buffer. Further, since in the shared buffer memory 301 the connection can be set freely, a change in the ratio between connection of a reverse signal from the BS to the GW 1 and that of a forward signal can be dealt with flexibly. For example, even when the ratio of unidirectional communication from the GW 1 to the BS is increased as in, for example, file-down load in the IP, this condition can be handled flexibly. Accordingly, flexible handling of various kinds of services such as multimedia can be effected with ease and mutual connections to other networks can be carried out easily.

(4) Operation in Case the Mobile Station MS Moves Through Each Zone

Concrete processes carried out in the GW 1 and the DH 30 when the mobile station MS moves through each zone will be described. As an example, the following description will be given in connection with the DH 30-1 using the shared buffer switch of address FIFO type as shown in FIG. 6 but similar processes can be executed in connection with the DH 30-1 using the shared buffer switch of address chain type shown in FIG. 5.

Firstly, the path and process of reverse signals from the mobile station MS to the GW 1 will be described.

Figure 8:
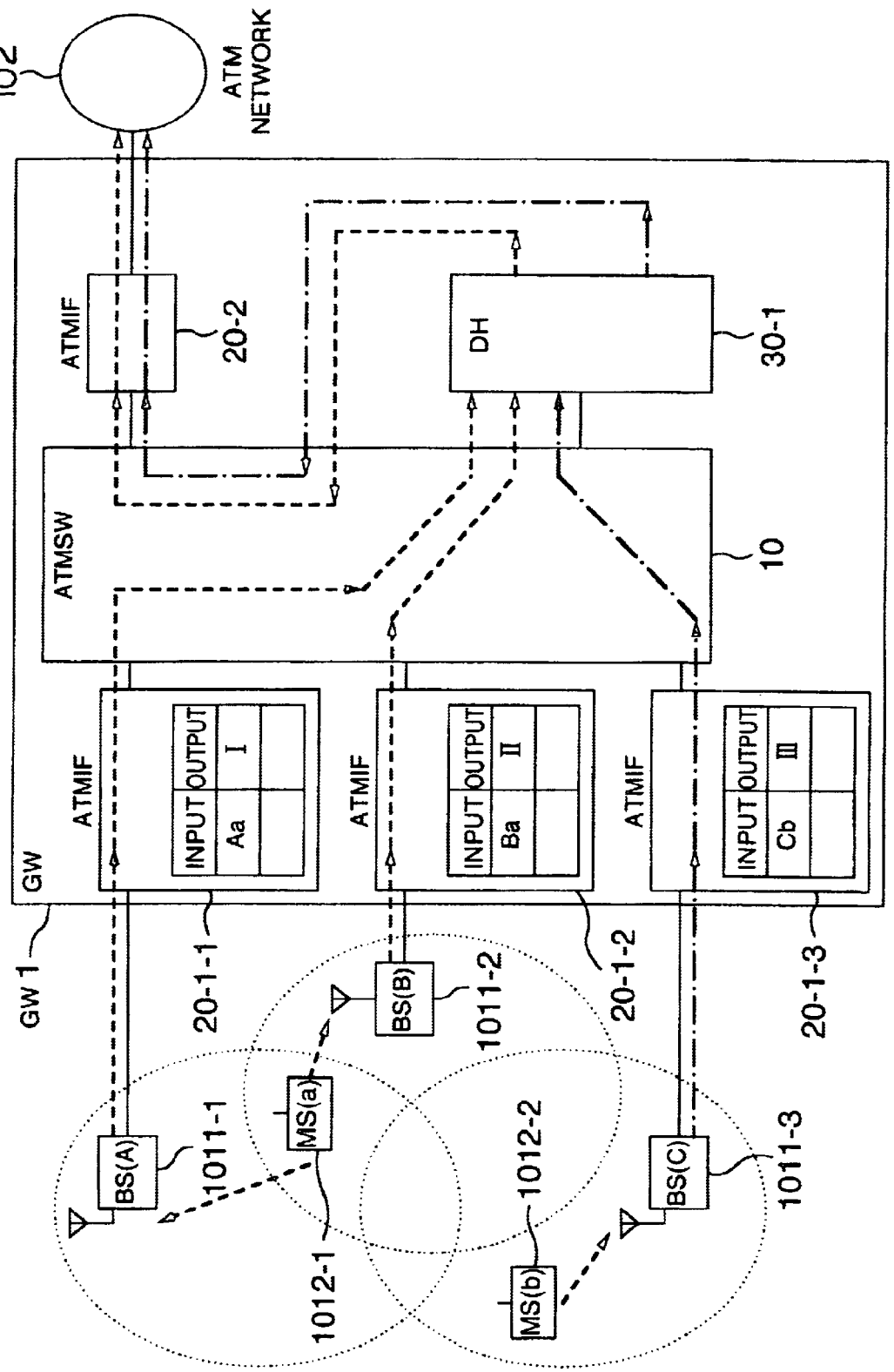
FIG. 8 is a diagram for explaining a reverse signal path in the network control system when the mobile station moves.

FIG. 8 is a diagram for explaining the reverse signal path in the GW 1 when the mobile station MS moves.

In the figure, there is illustrated a state in which a mobile station MS (a) 1012-1 communicates with both of a BS (A) 1011-1 and a BS (B) 1011-2, namely, handover is carried out and a mobile station MS (b) 1012-2 communicates with a BS (C) 1011-3. Both MS(a) and MS(b) communicate via the GW 1, which include ATMIF 20-1-1 through 20-1-3, ATMSW 10 DH 30-1 and ATMIF 20-2, with the ATM network 102. In order 5 to cause reverse signals of the MS(a) 1012-1 to be applied with a handover process in the DH 30-1, signals received via the BS(A) 1011-1 and the BS(B) 1011-2, respectively, are once subjected to buffering in the DH 30-1 and thereafter, these signals are read so as to be compared, in quality information, with each other, thereby ensuring that only signals of better quality can be transferred to the ATM network. Accordingly, to facilitate buffering in the DH 30-1, extra headers are assigned to ATM cells by means of the ATMIFs 20-1-1, 20-1-2 and 20-1-3. Concretely, on the assumption that a signal of MS(a) received via the BS(A) is assigned with an identifier "Aa", this signal is assigned with an extra header "I" by means of the ATMIF 20-1-1. The CP 60 writes information of the extra header in a conversion table of each of the ATMIFs 20-1-1, 20-1-2 and 20-1-3. Similarly, on the assumption that a signal of MS(a) received via the BS(B) is assigned with an identifier "Ba", this signal is assigned with an extra header "II" by means of the ATMIF 20-1-2. Further, on the assumption that a signal of MS(b) received via the BS(C) is assigned with an identifier "Cb", this signal is assigned with an extra header "III" by means of the ATMIF 20-1-3. By making values of the extra headers assigned by means of each ATMIF coincident with connection numbers of the DH 30-1, buffering in the DH 30-1 can be effected in accordance with the values of the extra headers. FIG. 9 is a diagram for explaining the reverse signal process carried out in the DH 30-1 when the mobile station MS moves.

In the figure, in connection with the diversity handover processing apparatus constructed by using the address FIFO type shared buffer switch, a state of the memory and table in the DH 30-1 as shown in FIG. 6 is concretely illustrated. In the shared buffer memory 301, ATM cells are stored at addresses indicated by the idle address buffer 306 (in FIG. 9, at addresses "1" to "7" in the shared buffer memory 301). Firstly, it is assumed that when an ATM cell indicated by the identifier Aa is inputted, the address "1" is read out of the idle address buffer 306. At that time, the inputted ATM cell is stored at the address "1" in the shared buffer memory 301. Incidentally, the extra header "I" is assigned to the ATM cell having the identifier Aa and therefore information indicative of the address "1" is stored in the address FIFO 3011-1. Similarly, an ATM cell having the identifier Ba is stored at the address "2". Since the header possessed by this cell is "II", information indicative of the address "2" is stored in the address FIFO 3011-2.

Incidentally, both the signals having the identifiers Aa and Ba are signals originating from the mobile station MS(a) and they are objects of the selective combining process. The selective combining of these signals is carried out on the basis of information set into the combining/copy information table 309 by means of the CP 60. Here, the signals having the extra headers "I" and "II" are objects of the selective combining and information to this effect is set in the combining/copy information table 309. Here, the signals having the extra headers "I" and "II" undergo buffering at connection numbers "I" and "II" in the DH 30-1, indicating that the connection numbers "1" and "2" are objects of the selective combining. In FIG. 9 and ensuing similar figures, only a table for selective combining is illustrated in connection with the combining/copy information table 309 for the sake of explaining the selective combining and a table for copy in the table 309 is omitted. As an example, the number of cells (3 cell, 2 cell, 2 cell 0 cell, 0 cell, respectively) stored in each address FIFO 3011 (3011-1 through 3011-5) is stored in the buffer capacity table 3010 in respect of each connection number. Cells processed in the combining/copy processor 302 are transferred to different transfer destinations and so ATM headers or new headers are assigned to the ATM cells in the processor 302. Accordingly, header information is stored in fact in the combining/copy information table 309 but this is omitted in FIG. 9.

The combining/copy controller 308 sequentially reads the table for selective combining in the combining/copy information table 309. As the controller 308 reads an item at which the mobile station is CS(a), "I" and "II" are indicated as synthesis connection numbers. This indicates that the connection numbers "I" and "II" are objects of selective combining process. Accordingly, signals are read cell by cell from the connection numbers "I" and "II" and a signal of better quality information is transferred to the ATMSW 10 by means of the combining/copy processor 302. At that time, when an address is first read out of the address FIFO 3011-1 of connection number "I", the read-out address indicates "1" and therefore, the ATM cell at the location indicated by the address "1" is read out of the shared buffer memory 301 and subsequently, when an address is read out of the address FIFO 3011-2 of connection number "II", the read-out address indicates "2" and therefore the ATM cell at the location indicated by the address "2" is read out of the shared buffer memory 301. Quality values of the thus read ATM cells are compared. As reading of the table for selective combining in the combining/copy information table 309 proceeds similarly, an item at which the mobile station is MS(b) is reached. At that time, only the connection number "III" is registered, so that the combining/copy processor 302 does not perform the selective combining and the cell similarly read out is transferred as it is to the ATMSW 10. The buffer capacity table 3010 supervises the capacity of each buffer in order that reading of the buffer can be so controlled as to be inhibited when the capacity is below a certain threshold value.

Figure 10:
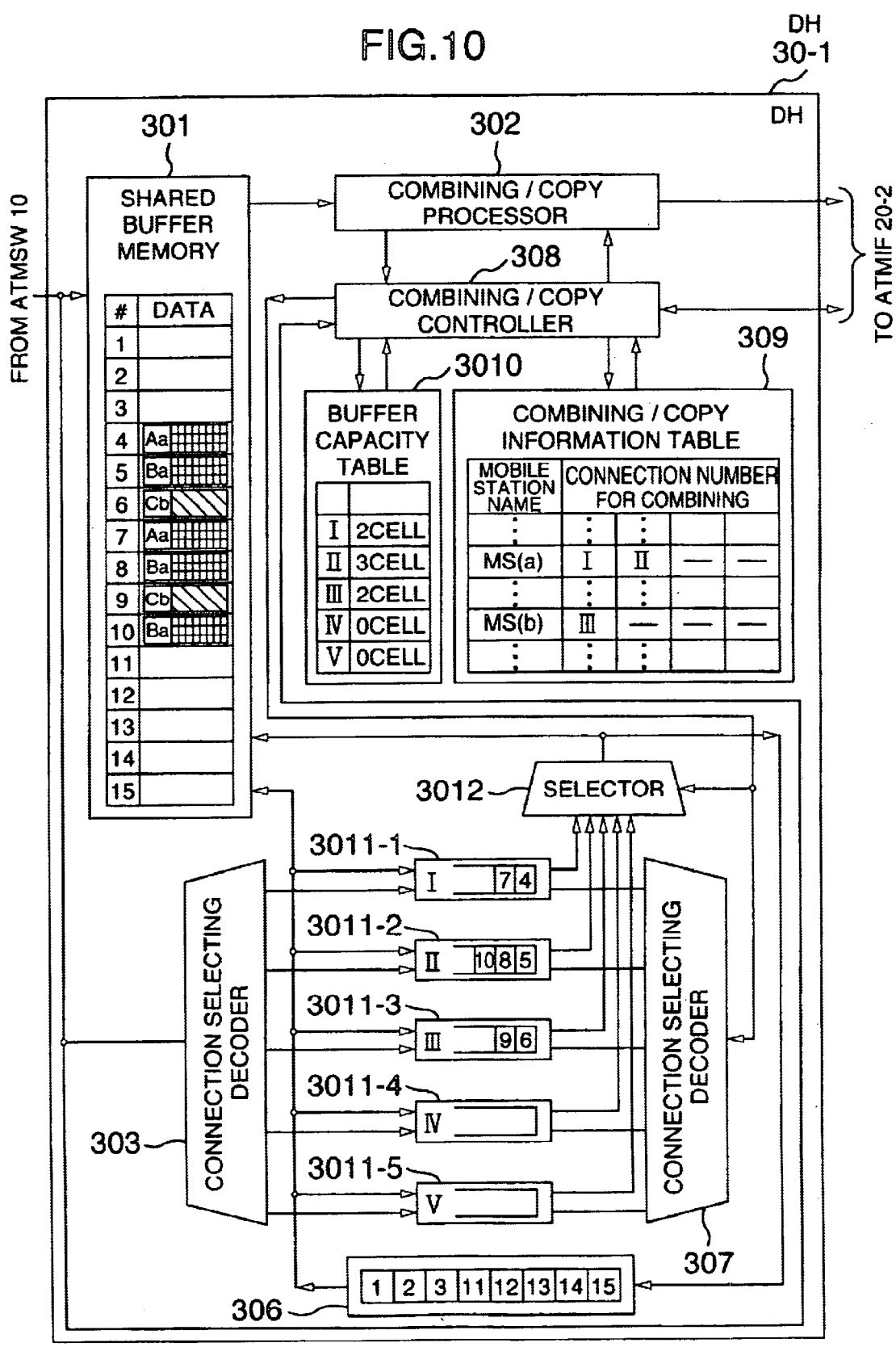
FIG. 10 is a diagram for explaining another reverse signal process in the diversity handover processing apparatus when the mobile station moves.

Next, FIG. 10 is a diagram for explaining the reverse signal process carried out in the diversity handover processing apparatus when the mobile station MS moves.

In the figure, a state is illustrated in which after the cells at the addresses "1", "2" and "3" in the shared buffer memory 301 are read as described in connection with FIG. 9, three cells are further written while the mobile station MS does not move. The cells at the addresses "1", "2" and "3" have been read, no ATM cells are present at these addresses. Accordingly, the address information of these addresses is stored in the idle address buffer 306. If, at the time that an ATM cell having the identifier Ba is inputted, an address read out of the idle address buffer 306 is "8", this cell is stored at the location indicated by address "8" similarly to the above and then the information indicative of the address "8" is stored in the address FIFO 3011-2 of "II" indicated by the extra header.

Figure 11:
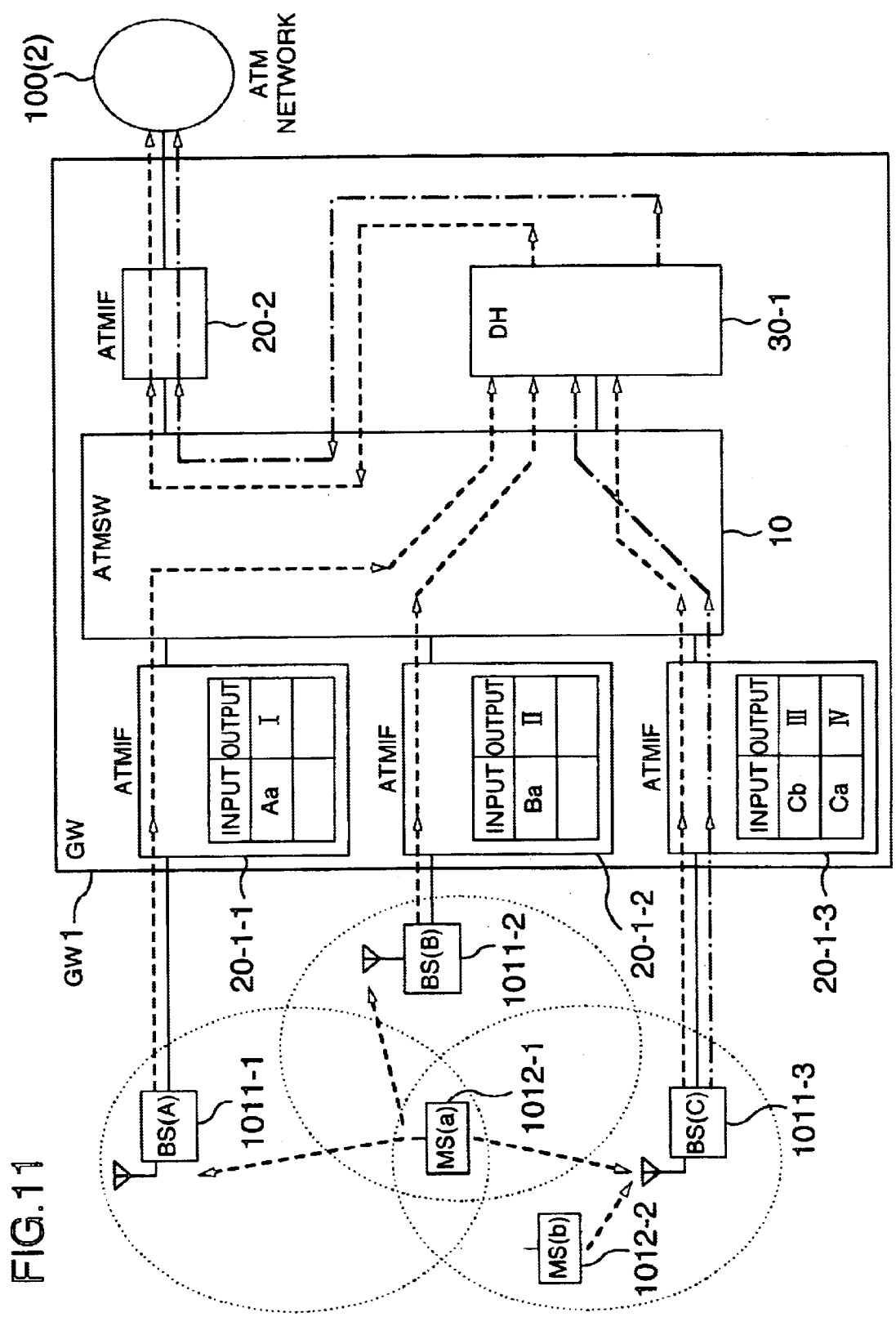
FIG. 11 is a diagram for explaining another reverse signal path in the network control system when the mobile station moves.
Figure 12:
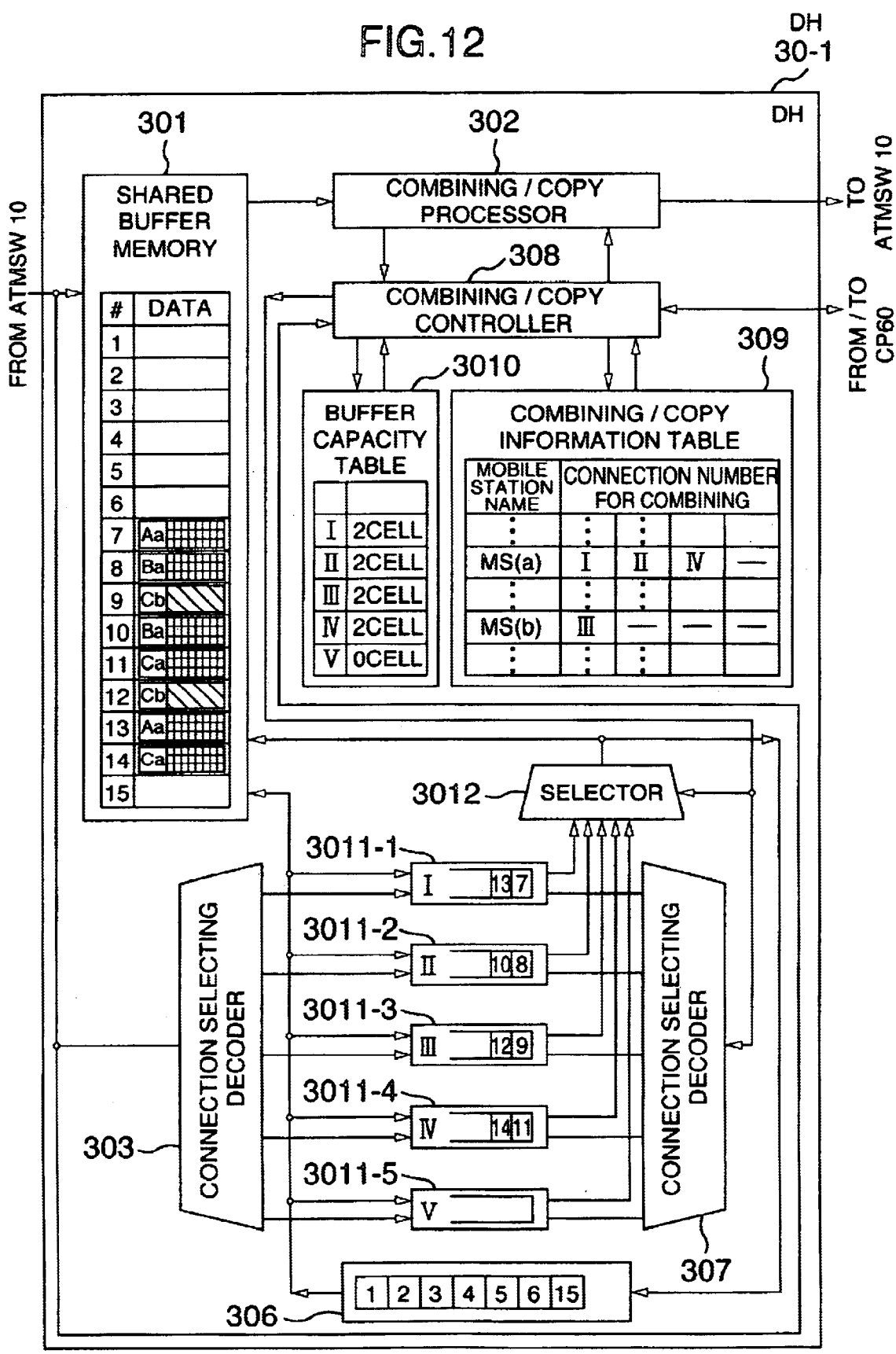
FIG. 12 is a diagram for explaining still another reverse signal process in the diversity handover processing apparatus when the mobile station moves.

FIG. 11 is a diagram for explaining the reverse signal path in the GW 1 when the mobile station MS moves. FIG. 12 is a diagram for explaining the reverse signal process carried out in the diversity handover processing apparatus when the mobile station MS moves.

In these figures, a state is illustrated in which a mobile station MS(a) moves to communicate with all of BS(A), BS(B) and BS(C). In comparison with FIG. 8, a signal of MS(a) received via the BS(C) is added. At that time, an idle connection "IV" of the DH 30-1 is allotted. If the signal of MS(a) received via the BS(C) is assigned with an identifier Ca, the ATMIF 20-1-3 is set by the CP 60 such that an extra header "IV" is assigned for the identifier Ca. Then, as shown, addresses "11" and "14" are stored in the address FIFO 3011-4 corresponding to the connection number "IV". At that time, the signal having the identifier Ca is stored in the addresses "11" and "14" of the shared buffer memory 301. Further, the signal of connection number "IV" is received from the mobile station MS(a) and is an object of selective combining together with the signals of connection numbers "I" and "II". Accordingly, it is indicated on the combining/copy information table 309 that the connection numbers "I", "II" and "IV" are objects of the selective combining.

Figure 13:
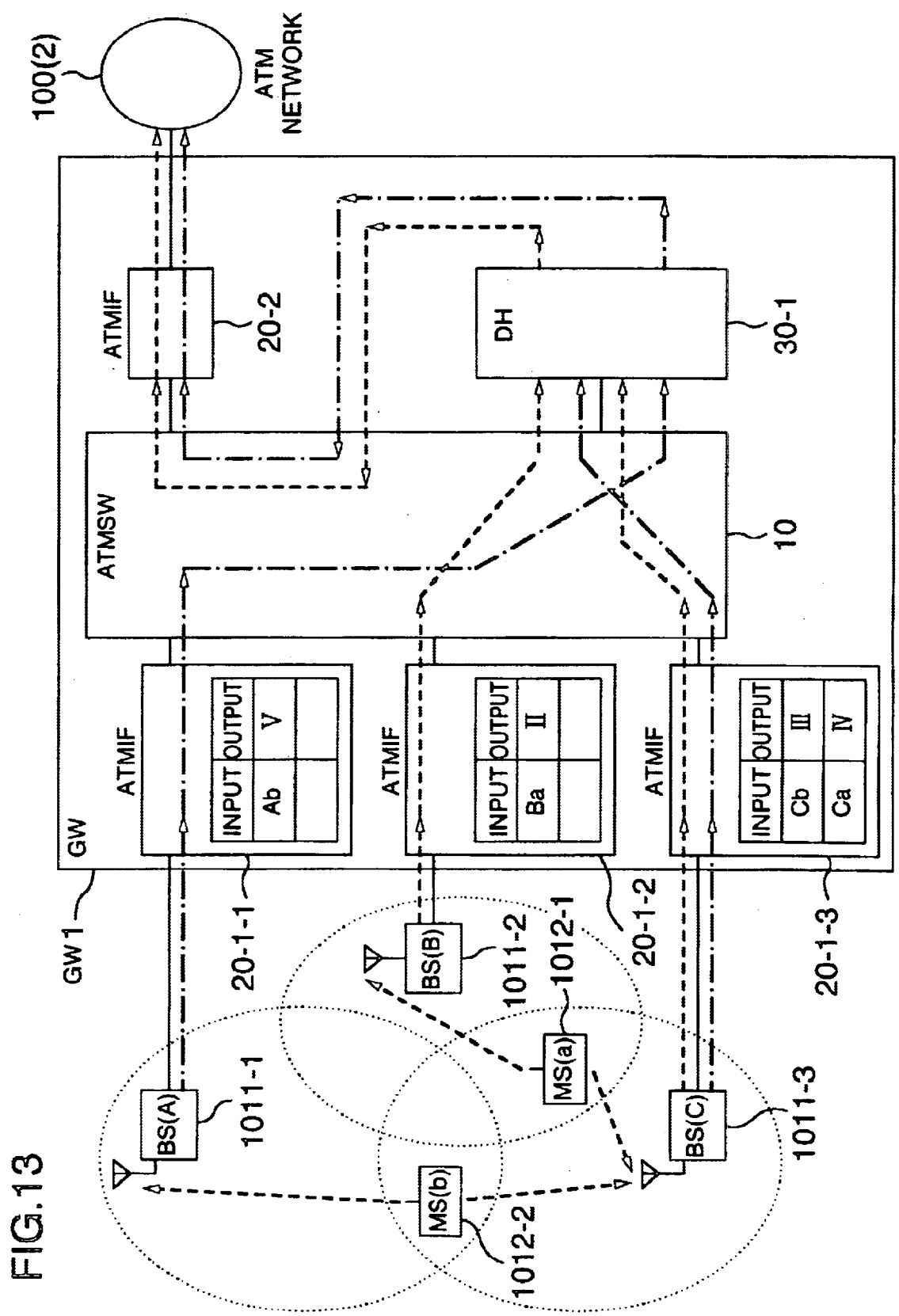
FIG. 13 is a diagram for explaining still another reverse signal path in the network control system when the mobile station moves.
Figure 14:
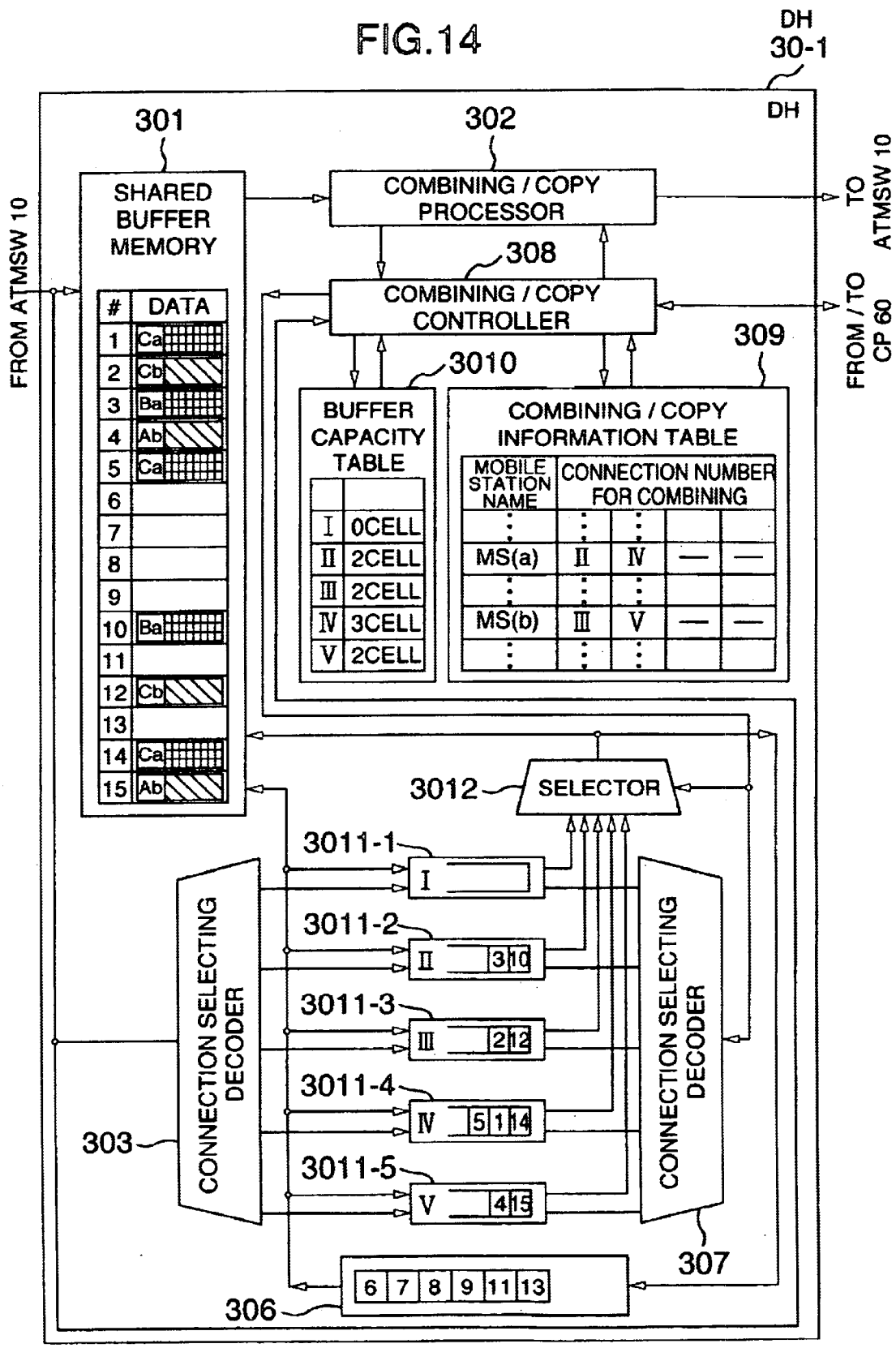
FIG. 14 is a diagram for explaining still another reverse signal process in the diversity handover processing apparatus when the mobile station moves.

FIG. 13 is a diagram for explaining the reverse signal path in the GW 1 when the mobile station MS moves. FIG. 14 is a diagram for explaining the reverse signal process carried out in the diversity handover processing apparatus when the mobile station MS moves.

These figures show a state in which both the mobile stations MS(a) and MS(b) have further moved. The mobile station MS(a) interrupts communication with the BS(A) to communicate with only the BS(B) and BS(C). The mobile station MS(b) adds communication with the BS(A) to communicate with the BS(A) and BS(C). In connection with the MS(a), the CP 60 commands that the item of input of identifier Aa should be deleted from the table of the ATMIF 20-1-1 for the purpose of fulfilling communication deletion. Accordingly, the signal of identifier Aa at the address "13" is deleted and the connection number "I" is deleted from a column corresponding to MS(a) in the combining/copy information table 309. A connection number "V" has not been used yet as a connection of the DH 30-1. But the MS(b) now adds communication with the BS(A) and therefore, the ATMIF 20-1-1 is set such that the extra header "V" is assigned to an identifier Ab. Addresses "15" and "4" are used for the identifier Ab and the connection number "V" is added to a column corresponding to MS(b) in the combining/copy information table 309. Further, as shown, an idle state taking place at the previously used address, for example, "1" is used to preserve the signal of different connection. Here, a signal of connection number "IV" for the identifier Ca is stored at the location of the address "1".

Figure 15:
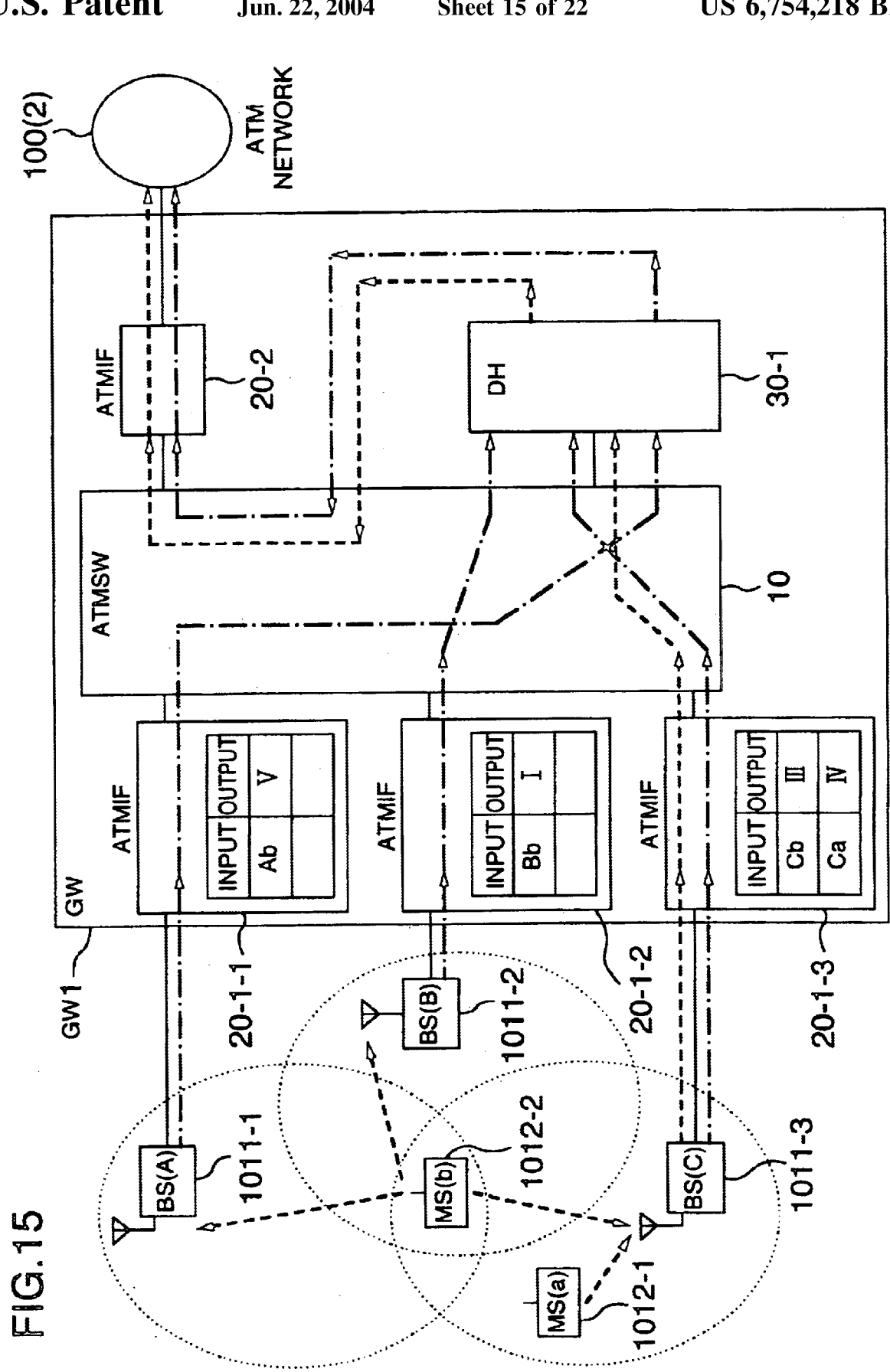
FIG. 15 is a diagram for explaining still another reverse signal path in the network control system when the mobile station moves.
Figure 16:
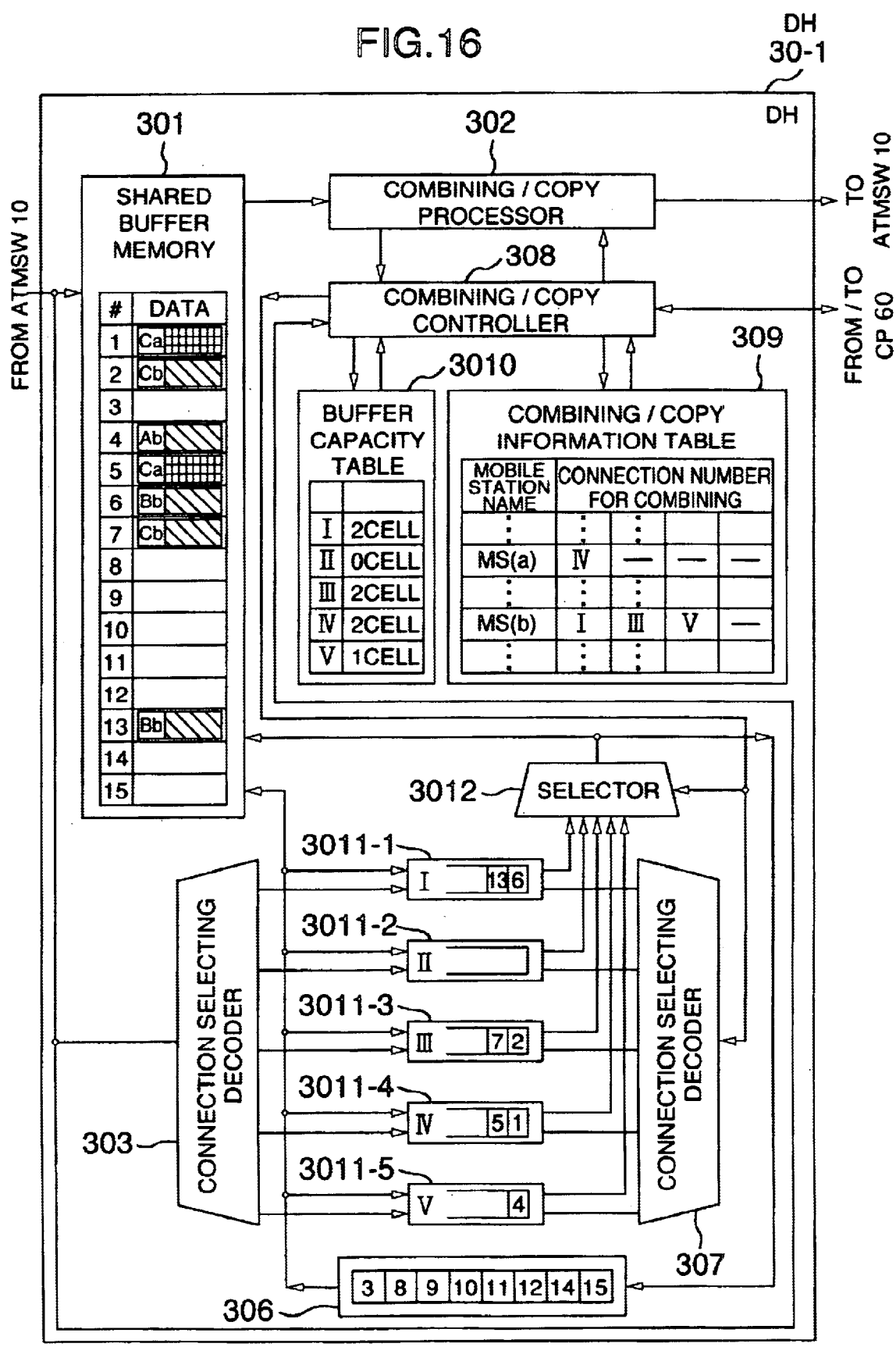
FIG. 16 is a diagram for explaining still another reverse signal process in the diversity handover processing apparatus when the mobile station moves.

Next, FIG. 15 is a diagram for explaining the reverse signal path in the radio network control system GW 1 when the mobile station MS moves. FIG. 16 is a diagram for explaining the reverse signal process carried out in the diversity handover processing apparatus DH 30-1 when the mobile station MS moves.

In these figures, a state is illustrated in which the MS(b) communicates with all of the BS(A), BS(B) and BS(C) whereas the MS(a) communicates with only the BS(C). In this case, too, the ATMIFs 20-1-1 to 20-1-3 are set similarly to the above. In the combining/copy information table 309, the connection number "II" in a column corresponding to MS(a) is deleted and the addresses "3" and "10" become idle. Further, the connection number "I" is added to a column corresponding to MS(b) and ATM cells are stored at addresses "6" and "13". In the instances shown in FIGS. 8 to 12, the connection number "I" is used for the MS(a) but, once this connection is released, it can be used for the MS(b) as shown in FIG. 16.

As described above, in the shared buffer memory, the memory area can be used freely and dynamically.

Figure 17:
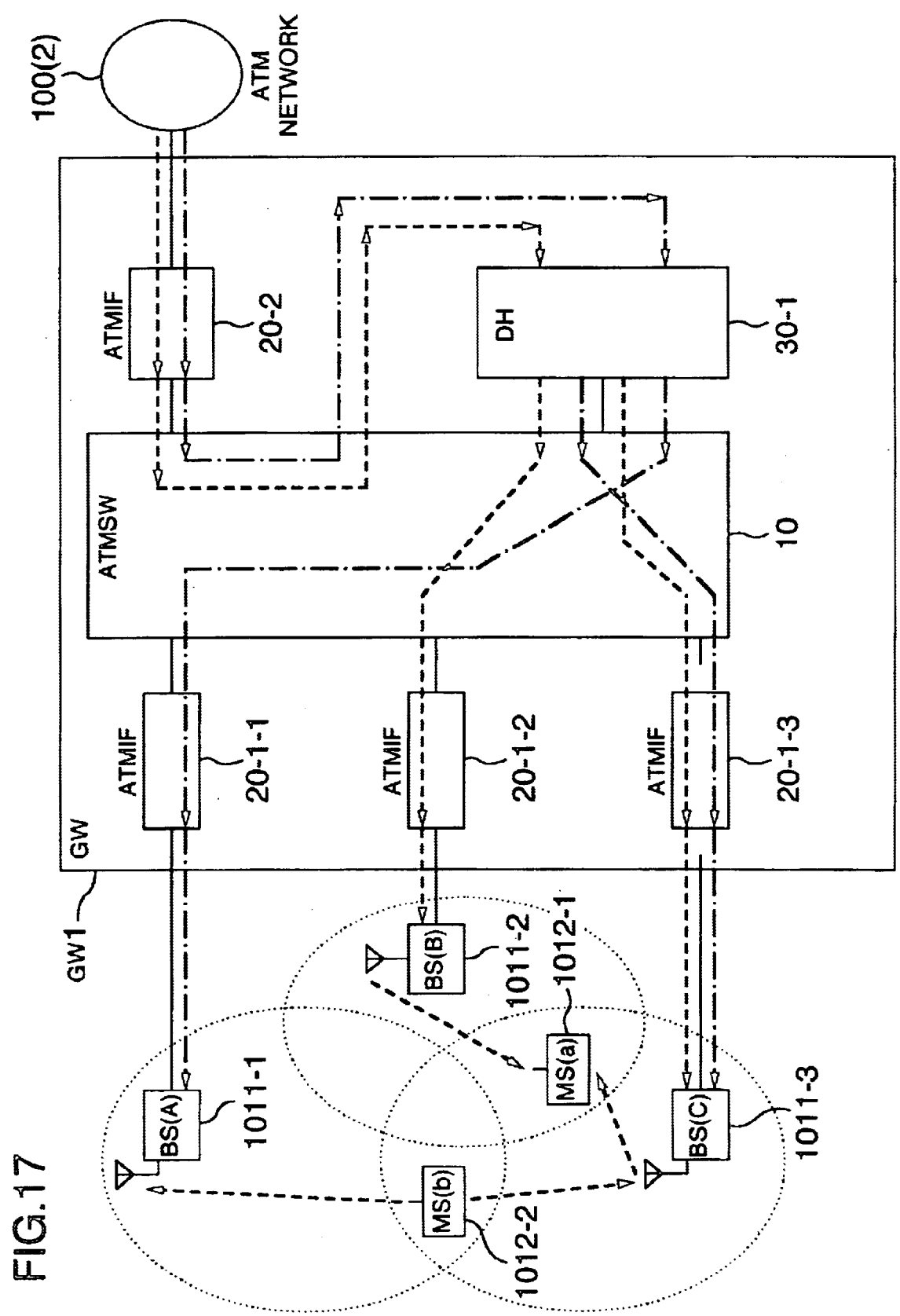
FIG. 17 is a diagram for explaining a forward signal path in the network control system when the mobile station moves.

FIG. 17 is a diagram for explaining the forward signal path in the GW 1 when the mobile station MS moves.

In the figure, there is illustrated the flow of signal in connection with the copy process of forward signal. While the MS(a) communicates with the BS(E) and BS(C), the MS(b) communicates with the BS(A) and BS(C) and therefore signals must be transferred from the GW 1 to these base stations. To this end, in the DH 30-1, signals from the ATM network 100(2) to the MS(a) and MS(b) are copied by a necessary number and the copies are transmitted to BS(A), BS(B) and BS(C). Each BS(B) and BS(C) transmit, by radio, to the MS(a) the signals transferred from the DH 30-1 through the ATMSW 10 and the ATMIF5 20-1-2 and 20-1-3. Similarly, the signals of the BS(A) and BS(C) are transmitted to the MS(b).

(5) Operation During Selective Combining

Next, operation during the selective combining of reverse signal will be described.

Figure 18:
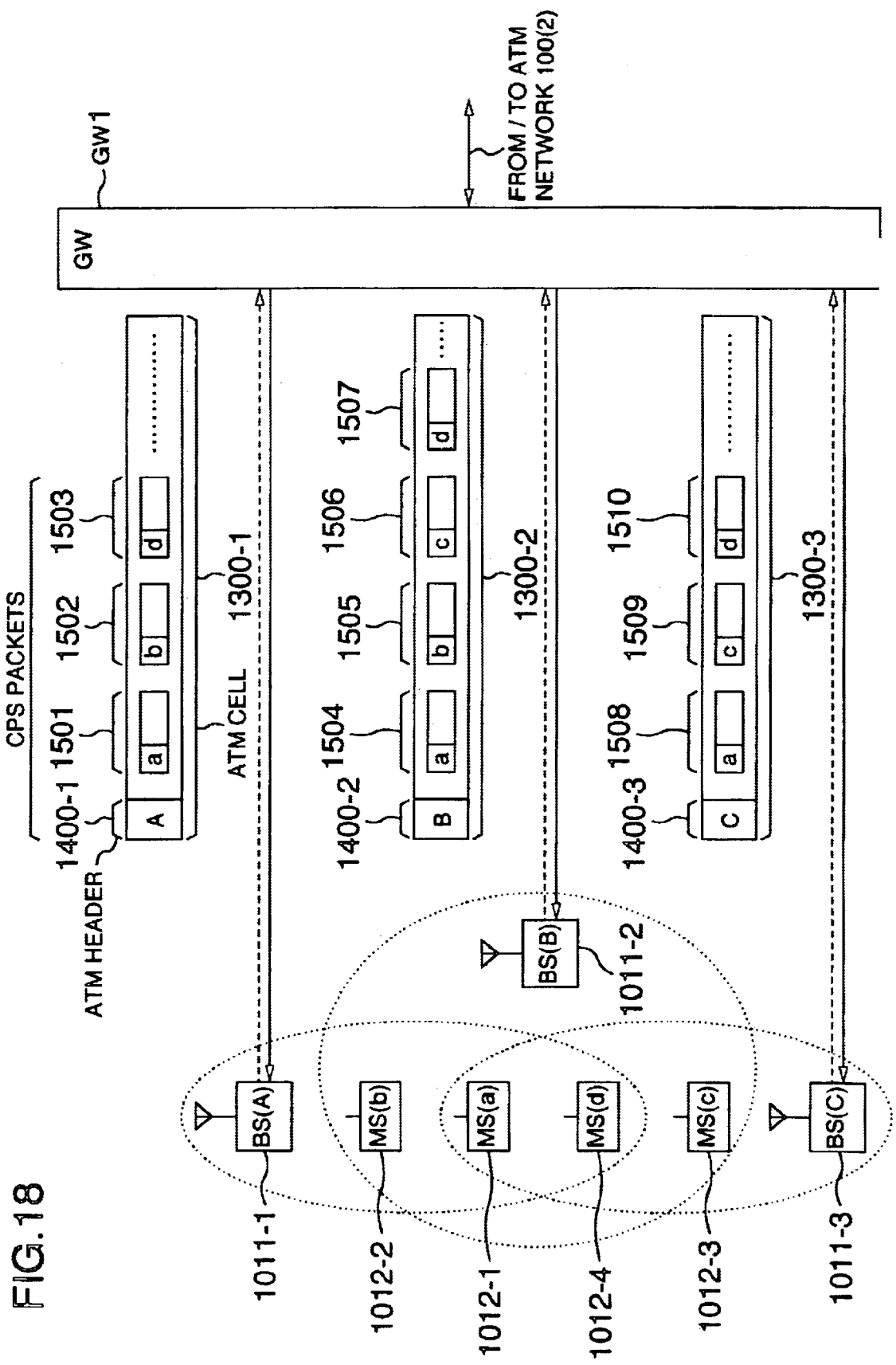
FIG. 18 is a diagram for explaining individual signal headers during reverse signal selective combining.

FIG. 18 is a diagram for explaining individual signal headers during the reverse signal selective combining.

Assumptively, mobile stations MS(a), MS(b), MS(c) and MS(d) are now placed in handover condition as illustrated. When taking a voice system, for instance, a signal from each mobile station MS is a voice packet and one voice packet is shorter than an ATM cell (when the signal rate is 8 kbit/s and the voice packet is generated every 10 ms, the payload part of the packet is of 10 bytes) and therefore a method is employed in which a plurality of voice packets are multiplexed onto an ATM cell and then transferred. As this method, there is available the AAL type 2 prescribed in the ITU-T. As an example, there is illustrated a state in which voice packets (CPS packets) generated by the mobile stations MS(a), MS(b) and MS(d) are multiplexed onto an ATM cell in the BS (A). The ATM cell 1300-1 has an ATM header 1400-1 of "A" and this one cell contains CPS packets 1501, 1502 and 1503 having CPS packet headers "a", "b" and "d", respectively.

Figure 19:
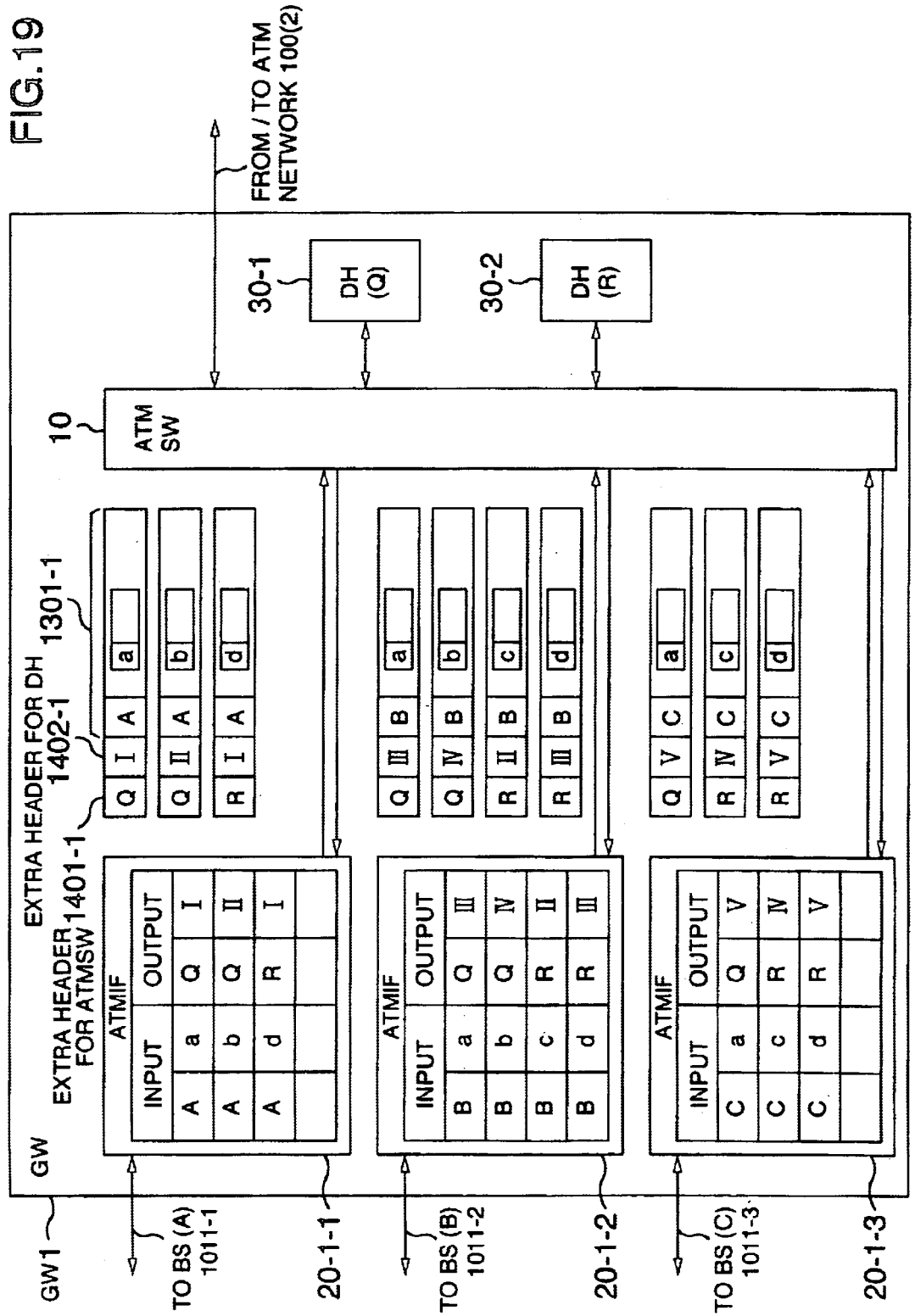
FIG. 19 is a diagram for explaining individual process tables and data formats on the base station side in the network control system.

FIG. 19 is a diagram for explaining each processing table and data format on the BS side in the GW 1.

In the figure, there are illustrated processing tables in ATMIFs 20-1-1 to 20-1-3 accommodating to the respective BSs and formats of data which have passed through the ATMIFs 20-1-1 to 20-1-3. Each of the ATMIFs 20-1-1 to 20-1-3 has a processing table as shown and the CP 60 sets the processing table during call connection, call interruption or, addition or deletion of handover. Only the tables for reverse signal processing are shown in the figure. The input column in the table of each of the ATMIFs 20-1-1 to 20-1-3 indicates the value of header of the ATM cell by which the inputted CPS packets are transferred and the headers of the CPS packets; and the output column indicates extra headers for ATM switch (ATMSW) associated with the ATM cells and extra headers for diversity handover (DH). These extra headers are generated when the CPS packets as shown in the input column arrive. In the ATMSW 10, switching is carried out with only the extra headers for ATMSW. In a system consisting of a plurality of bHs 30-1 and 30-2, signals of the same mobile station MS must be transferred to the same DH 30-1 (Q) or the same DH 30-2 (R). To this end, switching is carried out in accordance with the extra headers for ATMSW. Signals transmitted from the ATMIFs 20-1-1 to 20-1-3 to the ATMSW 10 have each a data format having, as shown in the figure, an extra header for ATMSW 1401-1 indicative of a DH number, an extra header for DH 1402-1 indicative of a connection number and an ATM cell 1301-1.

FIG. 20 is a diagram for explaining individual processing tables on the DHs 30-1 and 30-2 side and each data format in the GW 1.

In the figure, a state after switching in the GW 1 is illustrated. In each of the DHs 30-1 and 30-2, buffering in respect of each connection is carried out in accordance with the extra headers for DH. When a connection is to be added newly, the addition can be effected by merely designating an idle connection number. It is indicated by the combining/copy information table 309 whether the connection is an object of handover (in the figure, only a table for selective combining is illustrated. After the selective combining, the extra header is exchanged with a new one and in fact, a table of exchanged headers, not shown, is provided on the right). In the figure, ATM cells of DH extra header "Q" are transmitted to the DH 30-1 (Q) and ATM cells of DH extra header "R" are transmitted to the DH 30-2 (R). Further, in a combining/copy information table 309-1, for example, connection numbers and mobile station names are stored correspondingly in accordance with extra headers "I" to "V" and CPS packet headers "a" and "b" of the transmitted ATM cells.

FIG. 21 shows an example of a diagram for explaining the copy process of forward signals. Here, an instance is illustrated in which forward signals to the mobile stations MS(a) and MS(b) are stored corresponding to connection numbers "VI" and "VII". For example, a signal to the MS(a) is copied by three and the copies are commanded to be assigned with extra headers A and a, headers B and a and headers C and y, respectively. The values of the combining/copy information table 309 are set by the CP 60 (only the combining/copy information table 309 for forward signals is illustrated in FIG. 21).

FIG. 22 shows the flow of processing during the diversity handover. Firstly, a mobile station MS 22-110 transmits information such as voice in the form of air packets 22-3 to a base station BS 22-2. Especially, in the case of voice, CPS packets are used. When receiving the air packets 22-3, the base station 22-2 adds reception quality information 2200 of the air packets 22-3 and put together the air packets 22-3 and air packets from different mobile stations to store them in a payload of one ATM cell 1300-1 with the aim of improving the line efficiency between the mobile station and the GW. Subsequently, the base station transfers the ATM cell 1300-1 to the GW 1-1. When receiving the ATM cell 1300-1, the GW 1-1 decomposes the ATM cell 1300-1 in a unit of packet in an ATMIF 20-1 and generates one ATM cell 1301-1 for one air packet. Thereafter, as per FIG. 5 air packets to be subjected to diversity combining are read by means of the shared buffer memory 301 and combining/copy processor 308 in timed relationship to the air packets and then transferred to the combining/copy processor 302. In the combining/copy processor 302, quality evaluation is carried out on the basis of the quality information added to the air packets so that the ATM cell 1301-1 storing a packet of good quality may be selected and an ATM cell storing another packet of bad quality, such as ATM cell 1301-3, may be discarded. Finally, air packets destined for the same destination are put together by means of the ATMIF 20-2 so as to be stored in one ATM cell 1305-1 and this ATM cell is transferred. In this manner, the diversity combining can be ensured.

What is claimed is:

1. A diversity handover processing apparatus for use in a network control system for interconnecting a network to other networks, comprising:

a shared buffer memory which stores signals input from a communication terminal and converted into ATM cells, said shared buffer memory including a main buffer memory for storing ATM cells, an idle main buffer memory for managing an idle address of said main buffer memory, decoders for connection from/to ATM switches, address registers for storing read and write addresses of said main buffer memory for the ATM cells, and a controller for controlling operation of said shared buffer memory so as to process the ATM cells;

a combining/copy information table which stores connections necessary to one of a selective combining and a copy of said ATM cells received from said main buffer memory;

a combining/copy controller which reads information concerning connections in said combining/copy information table in respect of said communication terminal;

a shared buffer memory handling section which designates addresses contained in the information read by said combining/copy controller, said addresses being of said main buffer memory and concerning the connection; and a combining/copy processor which performs one of the selective combining and the copy of the ATM cells read out of said main buffer memory in respect of said communication terminal.

2. A diversity handover processing apparatus according to claim 1, further comprising:

a buffer capacity table which stores correspondence between said connections and the capacity of buffers utilizing said shared buffer memory.

3. A diversity handover processing apparatus according to claim 1, wherein said combining/copy controller commands a plurality of connections indicated by said combining/copy information table in respect of said communication terminal to said shared buffer memory handling section, said shared buffer memory handling section controls operation to read a plurality of ATM cells corresponding to said plurality of commanded connections from said shared buffer memory, and said combining/copy processor performs the selective combining on the basis of quality information indicated in said plurality of read-out ATM cells.

4. A diversity handover processing apparatus according to claim 3, wherein said combining/copy processor copies said ATM cells read out of said shared buffer memory on a basis of said combining/copy information table and said buffer capacity table to provide a plurality of copies of said ATM cells, and said combining/copy controller controls operation to add destination information to said plurality of copied ATM cells.

5. A diversity handover processing apparatus according to claim 3, Wherein said diversity handover processing apparatus receives a plurality of packets destined for the same transmission destination from a plurality of communication terminals, said plurality of packets being contained in one ATM cell.

6. A diversity handover processing apparatus according to claim 5, wherein when the length of said packets from said communication terminals exceeds a payload length of one ATM cell, said packets are divided into a plurality of ATM cells and transmitted to the same transmission destination.

7. A diversity handover processing apparatus according to claim 1, wherein said shared buffer memory handling section includes:

a first connection selecting decoder which selects a transmission destination of ATM cells inputted from said communication terminal;

write address registers which stores write addresses necessary for writing ATM cells into said shared buffer memory in respect of each connection;

read address registers which stores addresses necessary for reading ATM cells from said shared buffer memory in respect of each connection;

a second connection selecting decoder which designates a read address register on the basis of a connection designated by said combining/copy controller; and an address buffer which stores unused addresses of said shared buffer memory.

8. A diversity handover processing apparatus according to claim 7, wherein said write address registers and said read address registers are first in-first out type address registers corresponding to the individual connections, each of said registers being operative to read an address from said address buffer each time that an ATM cell is delivered out of said shared buffer memory in order that a subsequently inputted ATM cell is stored at said address in said shared buffer memory, and an address is inputted to an address register corresponding to a connection indicated by an ATM cell, and said ATM cell is read out of said shared buffer memory in accordance with said address delivered out of said address register.

9. A network control system for interconnecting a network to other networks, comprising:

a plurality of interfaces which converts signals from a communication terminal into ATM cells added with header information indicative of a predetermined destination;

an ATM switch which delivers said ATM cells inputted from said interfaces on the basis of header information of said ATM cells; and a diversity handover processing apparatus which applies one of a combining and a copy signal process to said ATM cells inputted from said ATM switch in accordance with a state of said communication terminal and transmitting the processed ATM cells to said ATM switch, wherein said diversity handover processing apparatus includes, said shared buffer memory including a main buffer memory for storing ATM cells, an idle main buffer memory for managing an idle address of said main buffer memory, decoders for connection from/to ATM switches, address registers for storing read and write addresses of said main buffer memory for the ATM cells, and a controller for controlling operation of said shared buffer memory so as to process the ATM cells.

10. A network control system according to claim 9, wherein said diversity handover processing apparatus includes a controlling section for giving, to said communication terminal, information on a plurality of connections to be applied with the selective combining of ATM cells and on quality.

11. A network control system according to claim 10, wherein said controlling section has a combining/copying information table for storing connections necessary to combining/copying ATM cells in respect of a transmission destination and a combining/copying controller for reading information concerning the connections in said combining/copying information table in respect of said communication terminal.

12. A network control system according to claim 9, wherein said diversity handover processing apparatus has a controlling section for giving, to said communication terminal, information on a plurality of connections to which copies of ATM cells are given, the frequency of copy operations and a transmission destination.

13. A network control system according to claim 12, wherein said controlling section has a copy information table for storing connections necessary to copy operation of ATM cells in respect of a communication destination and a copy controller for reading information concerning connections in said copy table in respect of said communication terminal.

14. A network control system according to claim 9, wherein said shared buffer memory of said diversity handover processing apparatus stores signals input from said communication terminal and converted into ATM cells.

* * * * *